United States Patent
Liguori et al.

(10) Patent No.: US 10,833,949 B2
(45) Date of Patent: Nov. 10, 2020

(54) EXTENSION RESOURCE GROUPS OF PROVIDER NETWORK SERVICES

(71) Applicant: Amazon Technologies, Inc., Seattle, WA (US)

(72) Inventors: Anthony Nicholas Liguori, Bainbridge Island, WA (US); Matthew Shawn Wilson, Bainbridge Island, WA (US)

(73) Assignee: Amazon Technologies, Inc, Seattle, WA (US)

( * ) Notice: Subject to any disclaimer, the term of this patent is extended or adjusted under 35 U.S.C. 154(b) by 29 days.

(21) Appl. No.: 16/196,736

(22) Filed: Nov. 20, 2018

(65) Prior Publication Data

US 2020/0162332 A1    May 21, 2020

(51) Int. Cl.
| | |
|---|---|
| *H04L 12/24* | (2006.01) |
| *G06F 9/455* | (2018.01) |
| *G06F 9/4401* | (2018.01) |

(52) U.S. Cl.
CPC ............ *H04L 41/12* (2013.01); *G06F 9/4416* (2013.01); *G06F 9/45558* (2013.01); *G06F 2009/45587* (2013.01); *G06F 2009/45595* (2013.01)

(58) Field of Classification Search
CPC ... H04L 41/12; G06F 9/45558; G06F 9/4416; G06F 2009/45595; G06F 2009/45587
See application file for complete search history.

(56) References Cited

U.S. PATENT DOCUMENTS

| | | | |
|---|---|---|---|
| 6,741,585 B1 * | 5/2004 | Munoz | ................ H04L 12/4633 370/352 |
| 7,484,091 B2 | 1/2009 | Bade et al. | |
| 7,996,836 B1 | 8/2011 | McCorkendale et al. | |
| 8,032,899 B2 | 10/2011 | Archer et al. | |
| 8,127,292 B1 | 2/2012 | Dobrovolskiy et al. | |
| 8,201,161 B2 | 6/2012 | Challener et al. | |
| 8,239,557 B2 | 8/2012 | McCune et al. | |
| 8,433,802 B2 | 4/2013 | Head et al. | |
| 8,514,868 B2 | 8/2013 | Hill | |
| 9,137,205 B2 * | 9/2015 | Rogers | .................... H04L 67/02 |
| 9,323,552 B1 | 4/2016 | Adogla et al. | |

(Continued)

FOREIGN PATENT DOCUMENTS

| | | |
|---|---|---|
| EP | 1701259 | 9/2006 |
| EP | 2557498 | 2/2013 |

OTHER PUBLICATIONS

U.S. Appl. No. 15/173,445, filed Jun. 3, 2016, Wilson, et al.

(Continued)

*Primary Examiner* — Michael Won
(74) *Attorney, Agent, or Firm* — Robert C. Kowert; Kowert, Hood, Munyon, Rankin & Goetzel, P.C.

(57) ABSTRACT

At a network manager of an extension resource group of a provider network, a message comprising a command to launch a compute instance is received at an address which is part of a first network configured at a premise external to the provider network. The extension resource group includes a first host at the external premise. Within a second network configured at the external premise, the first host is assigned an address within a second address range. Addresses within the second range are also assigned to hosts within the provider network. The command is transmitted to the first host, and a compute instance is instantiated.

20 Claims, 13 Drawing Sheets

System 100

(56) References Cited

U.S. PATENT DOCUMENTS

| | | | |
|---|---|---|---|
| 9,361,145 B1 | 6/2016 | Wilson et al. | |
| 9,407,599 B2* | 8/2016 | Koponen | H04L 45/54 |
| 9,485,323 B1* | 11/2016 | Stickle | H04L 67/32 |
| 9,979,694 B2* | 5/2018 | Brandwine | H04L 67/2823 |
| 10,095,537 B1* | 10/2018 | Neogy | G06F 9/45558 |
| 10,348,767 B1* | 7/2019 | Lee | H04L 67/10 |
| 10,498,611 B1* | 12/2019 | Kloberdans | H04L 12/66 |
| 2005/0013280 A1* | 1/2005 | Buddhikot | H04L 29/12358 |
| | | | 370/349 |
| 2005/0251806 A1 | 11/2005 | Auslander et al. | |
| 2008/0244553 A1 | 10/2008 | Cromer et al. | |
| 2010/0070970 A1 | 3/2010 | Hu et al. | |
| 2011/0075667 A1* | 3/2011 | Li | H04L 29/12018 |
| | | | 370/392 |
| 2011/0131443 A1 | 6/2011 | Laor et al. | |
| 2014/0108665 A1* | 4/2014 | Arora | G06F 9/5077 |
| | | | 709/227 |
| 2014/0208413 A1* | 7/2014 | Grobman | H04L 63/0227 |
| | | | 726/14 |
| 2015/0160884 A1* | 6/2015 | Scales | G06F 3/0608 |
| | | | 711/114 |
| 2016/0026573 A1 | 1/2016 | Jacobs et al. | |
| 2016/0077845 A1 | 3/2016 | Earl et al. | |
| 2016/0170781 A1 | 6/2016 | Liguori et al. | |
| 2017/0300354 A1* | 10/2017 | Dalal | H04L 41/0843 |
| 2017/0366606 A1* | 12/2017 | Ben-Shaul | H04L 67/1097 |
| 2018/0032360 A1* | 2/2018 | Agarwal | G06F 9/45558 |
| 2018/0260125 A1* | 9/2018 | Botes | G06F 16/275 |
| 2020/0057664 A1* | 2/2020 | Durham | G06F 12/1441 |
| 2020/0092138 A1* | 3/2020 | Tillotson | H04L 49/70 |
| 2020/0159555 A1* | 5/2020 | Liguori | G06F 9/5077 |

OTHER PUBLICATIONS

U.S. Appl. No. 14/869,907, filed Sep. 29, 2015, David Sean Russell.
U.S. Appl. No. 14/864,682, filed Sep. 24, 2015, Danilov, et al.
U.S. Appl. No. 14/535,056, filed Nov. 6, 2014, Potlapally, et al.
U.S. Appl. No. 15/199,489, filed Jun. 30, 2016, Liguori, et al.
U.S. Appl. No. 15/199,479, filed Jun. 30, 2016, Liguori, et al.
Zsgur Ulusoy, "Processing Real-Time Transactions in a Replicated Database System," 1994 Kluwer Academic Publishers, Boston, Revised Sep. 10, 1993, pp. 1-32.
Sergio Almeida, et al., "ChainReaction: a Causal+ Consistent Datastore based on Chain Replication," Eurosys'13 Apr. 15-17, 2013, Prague, Czech Republic, Copyright 2013 ACM 978-1-4503-1994-Feb. 13, 2004, pp. 85-98.
Scott Lystig Fritchie, "Chain Replication in Theory and in Practice," Erlang'10, Sep. 30, 2010, Baltimore, Maryland, USA. Copyright 2010 ACM 978-1-4503-0253-Jan. 10, 2009, pp. 1-11.
Robbert van Renesse, et al, "Chain Replication for Supporting High Throughput and Availability," USENIX Association, OSDI 2004: 6th Symposium on Operating Systems Design and Implementation, pp. 91-104.
Philip A. Bernstein, et al, "Concurrency Control and Recovery in Database Systems," Addison-Wesley Publication Company, ISBN 0-201-10715-5, 1987, pp. 1-58.
From Wikipedia, the free encyclopedia, "Bromium," downloaded on Jun. 27, 2016 from https://en.wikipedia.org/wiki/Bromium, pp. 1-4.
Xen, "Dom0" downloaded Jun. 6, 2016 from http://wiki.xen.org/wiki/Dom0, last updated Mar. 29, 2015, pp. 1-2.
Amazon Web Services, "Amazon Elastic Compute Cloud: User Guide for Linux Instances," Latest Version update 2015, pp. 1-816.
IBM, General Information, Version 4, Release 3.0, Fifth Edition, Apr. 2002, pp. 1-101.
From Wikipedia, the free encyclopedia, "Hypervisor," downloaded Jun. 6, 2016 from https://en.wikipedia.org/wiki/Hypervisor, pp. 1-7.
Axel Buecker, et al., "Reduce Risk and Improve Security on IBM Mainframes: vol. 1 Architecture and Platform Security," Redbooks, IBM, Dec. 2014, pp. 1-308.
From Wikipedia, the free encyclopedia, "VMware ESX," downloaded Jun. 6, 2016 from https://en.wikipedia.org/wiki/VMware_ESX, pp. 1-13.
From Wikipedia, the free encyclopedia, "Xen," downloaded from Jun. 6, 2016 from https://en.wikipedia.org/wiki/Xen, pp. 1-12.
U.S. Appl. No. 15/236,116, filed Aug. 12, 2016, Konrad Jan Miller et al.
International Search Report and Written Opinion from PCT/US2017/040049, dated Sep. 13, 2017, Amazon Technologies, Inc., pp. 1-12.
Udo Steinberg, et al., "NOVA: A Microhypervisor-Based Secure Virtualization Architecture", ACM, EuroSys'10, Apr. 13-16, 2010, pp. 209-222.
Sangster, et al., TCG Published, Virtualized Trusted Platform Architecture Specification, Specification Version 1.0, Revision 0.26, Sep. 27, 2011, pp. 1-60.
Network Functions Virtualisation (NFV); NFV Security; Security and Trust Guidance, ETSI GS NFV-SEC 003, V1.1.2, downloaded by EP on Jun. 4, 2016, pp. 1-57.
U.S. Appl. No. 15/374,520, filed Dec. 9, 2016, Akhilesh Mritunjai.
International Search Report and Written Opinion from PCT/US2017/040066, dated Sep. 21, 2017, Amazon Technologies, Inc., pp. 1-11.
Cong Xu, et al., "vSlicer: Latency-Aware Virtual Machine Scheduling via Differentiated-Frequency CPU Slicing", Purdue University, Purdue e-Pubs, 2012, pp. 1-14.
International Search Report and Written Opinion from PCT/US2017/040076, dated Oct. 6, 2017, pp. 1-13.
Amazon Web Services, "Amazon Elastic Compute Cloud: User Guide for Linux Instances," Latest Version update 2018, pp. 1-884.
Amazon Web Services, "Amazon Elastic Container Service: Developer Guide" API Version, Nov. 13, 2014, pp. 1-386.
Amazon Web Services, "AWS Lambda: Developer Guide" 2018, pp. 1-539.
AWS, "Annoucing Amazon EC2 Bare Metal Instances (Preview)", Retrieved from URL: https://aws.amazon.com/about-aws/whats-new/2017/11/announcing-amazon-ec2-bare-metal-instances-preview/ on Jan. 15, 2018, pp. 1-4.
U.S. Appl. No. 16/017,886, filed Jun. 25, 2018, Upendra Bhalchandra Shevade et al.
Amazon, "Announcing Amazon EC2 Bare Metal Instances (Preview)", Retrieved from URL: https://aws.amazon.com/about-aws/whats-new/2017/11/announcing-amazon-ec2-bare-metal-instances-preview/, pp. 1-4.
Brendan Gregg's Blog, "AWS EC@ VIrtualization 2017: Introducing Nitro", Retrieved from URL: http://www.brendangregg.com/blog/2017-11-29/aws-ec2-virtualization-2017.html, pp. 1-11.
U.S. Appl. No. 15/905,681, filed Feb. 26, 2018, Uphendra Bhalchandra Shevade, et al.
U.S. Appl. No. 16/196,723, filed Nov. 20, 2018, Anthony Nicholas Liguori et al.
U.S. Appl. No. 16/581,619, filed Sep. 24, 2019, Anthony Nicholas Liguori.

* cited by examiner

EXTENSION RESOURCE GROUPS OF PROVIDER NETWORK SERVICES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization host to be shared among multiple users by providing each user with one or more "guest" virtual machines hosted by the single virtualization host. Each such virtual machine may represent a software simulation acting as a distinct logical computing system that provides users with the illusion that they are the sole operators of a given hardware computing resource, while also providing application isolation and security among the various virtual machines. Instantiating several different virtual machines on the same host may also help increase the overall hardware utilization levels at a data center, leading to higher returns on investment.

A wide variety of virtual machine types, optimized for different types of applications such as compute-intensive applications, memory-intensive applications, and the like may be set up at the data centers of some cloud computing provider networks in response to client requests. In addition, higher-level services that rely upon the virtual computing services of such provider networks, such as some database services whose database instances are instantiated using virtual machines of the virtual computing services, may also be made available to provider network clients. For some types of applications, however, such as applications that process very large amounts of data that has to be stored at customer premises outside the provider network, services that are limited to providing virtualized resources using hardware located at data centers of the provider network may not be optimal, e.g., for latency-related and/or other reasons.

Figure 1:
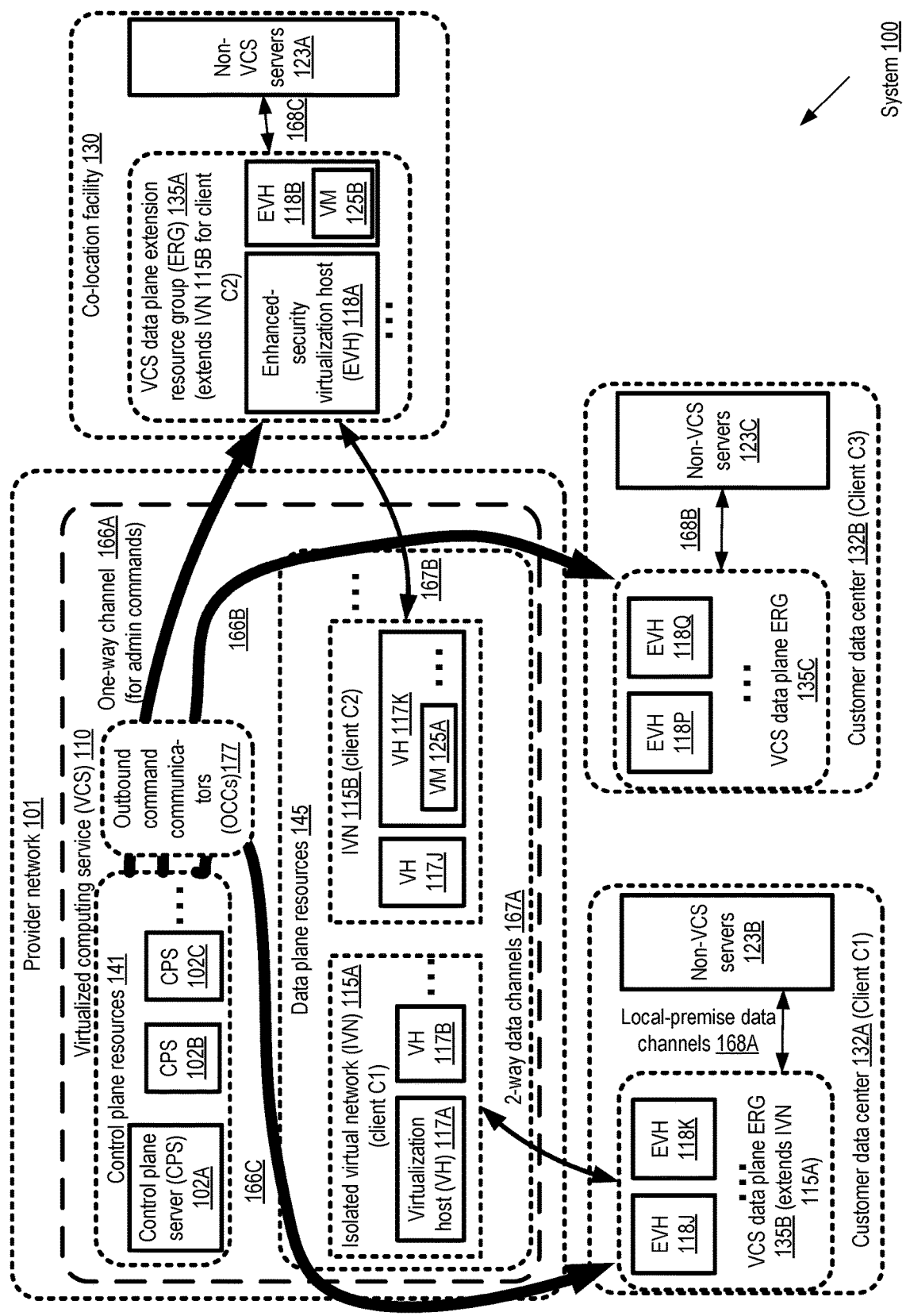
FIG. 1 illustrates an example system environment in which extension resource groups of a virtualized computing service of a provider network may be set up using resources located at premises external to the provider network, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for securely extending operations of a provider network's virtualized computing service to locations that are external to the data centers of the provider network are described. Networks set up by an entity such as a company or a public sector organization to provide one or more services (such as various types of multi-tenant and/or single-tenant cloud-based computing or storage services) accessible via the Internet and/or other networks to a distributed set of clients may be termed provider networks or service provider environments in various embodiments. Using the described techniques, in at least some embodiments clients of a virtualized computing service may be able to utilize hardware devices that are located at customer data centers, field locations (e.g., near cell phone towers in the case of clients that operate telecommunication companies) or co-location facilities to host virtual machines with the same features and capabilities as at least some of the types of virtual machines that can be set up at the provider network data centers.

In at least some embodiments, the hardware devices located outside the provider network may be pre-configured, e.g., by the provider network operator, with the appropriate combination of hardware, software and/or firmware elements to support various categories of virtual machines, and to do so in a manner that supports low-latency communications with other local devices at the same locations, does not compromise the security of the customer's data and applications, does not compromise the security of the provider network itself, and does not compromise the security of any other customers of the provider network. In at least some embodiments, the term "extension resource group" (ERG) may be used to refer to a collection of resources (e.g., hardware, software, firmware, configuration metadata and the like) located at a premise external to a provider network to enable virtual machines to be established and utilized at the premise. The premises (e.g., customer data centers, field locations, etc.) at which extension resource groups are established may be referred to as client premises in various embodiments. In effect, from the perspective of a customer of a virtualized computing service (VCS), in various embodiments an ERG may represent a local extension of the capabilities of the VCS, that can be set up at any desired physical location that has access to the Internet and can accommodate (e.g., with respect to physical space, electrical power, etc.) a set of hardware devices. From the perspective of the VCS itself, an ERG may be considered to be virtually located in the same provider network data centers as the core VCS infrastructure, while being physically located in a customer-selected premise. In some embodiments, in addition to or instead of standardized or customizable virtual machines of various categories, other types of program execution environments, such as bare-metal instances, software containers and the like may be set up and managed with the help of one or more computing services of a provider network. In one embodiment, a bare-metal instance supported by a VCS may comprise various processes of an operating system that directly control at least a portion of the hardware of the host being used, without utilizing virtualization (although a small subset of the hardware functionality may be virtualized in some cases). In such an embodiment, a hypervisor dedicated to virtualization management may not be required. A bare-metal instance may itself include functionality to host virtual machines in some embodiments. The term "compute instances" may be used in various embodiments to refer collectively to all the different kinds of execution environments (including virtual machines, bare-metal instances, software containers, etc.) that may be set up and managed on behalf of provider network clients, using resources at the provider network data centers and/or using ERGs. Note that while, in much of the following description, virtual machines are discussed as the primary examples of compute instances, the techniques described for setting up and using virtual machines at ERGs may be applied with equal success to other types of compute instances in various embodiments.

The resources of a virtualized computing service (VCS) may broadly be subdivided into two categories in various embodiments: control plane resources and data plane resources. Control plane resources may be used largely for administrative purposes, such as establishing isolated virtual networks for various customers, monitoring resource usage and health, identifying a particular virtualization host or server at which a requested virtual machine is to be launched, provisioning additional hardware as needed, and so on. Data plane resources may be used primarily for non-administrative tasks such as executing client applications, storing and transferring client application data, and so on. In various embodiments, when an ERG is set up at a customer-selected location, the resources of the ERG may be managed by control plane components of the VCS that are located in the data centers of the provider network. As such, in at least some embodiments, setting up and using an ERG at a given premise may not require control plane capabilities of the VCS to be duplicated locally; instead, secure network connections may be set up for control-plane commands to be transmitted from the data centers of the provider network to the ERG, and the resources of the ERG may be devoted primarily to data plane operations.

A VCS customer C1 who wishes to start using an ERG at a particular location, such as a particular customer data center CDC1, may do so by participating in a workflow similar to the following in at least some embodiments. C1 may first optionally select, from among a set of physical ERG configuration types (e.g., a "small" ERG configuration comprising a half-rack of servers of a standard size, a "medium" ERG configuration comprising a full rack of servers, a "large" ERG configuration comprising two full racks of servers, etc.), the specific configuration that is to be set up at the desired location or premise. By default, if C1 does not wish to explicitly pick an ERG configuration type, a particular configuration type (such as a "small" configuration) may be selected for the client in some embodiments, thereby further reducing the effort required from C1. Next, a request for the ERG may be submitted via a programmatic interface (e.g., a web-based console, an application programming interface (API), a command line tool, a graphical user interface, etc.) to the VCS. After the request is approved, the hardware of the ERG (pre-installed with the appropriate software/firmware) may be transported to the desired location, connected to power and connected to the Internet.

In at least some embodiments, a network manager may be instantiated at one or more of the servers of the ERG in response to the detection of one or more triggering conditions (such as the detection of power and/or Internet connectivity). Such an ERG network manager (ENM) may then initiate the automated establishment of (or at least participate in the automated establishment of) secure network connectivity with one or more VCS components (e.g., including control-plane elements) at one or more provider network data centers, e.g., without requiring additional configuration guidance from C1. After connectivity has been established between the ERG (at CDC1) and the VCS components (at the provider network data center(s)), in various embodiments C1 may issue commands to instantiate virtual machines (and/or perform other operations using virtual machines) that use ERG resources, in a manner analogous to the way in which such commands would be issued with respect to virtual machines that use only provider network resources. From the perspective of C1, the functionality of the VCS may now seamlessly be utilized using local resources within CDC1 (as well as resources located in the provider network data centers, if desired). The virtual machines (VMs) set up at the ERG may communicate (e.g., with the help of the ENM, which may perform address translation and/or other encapsulation protocol-related processing) with non-VCS devices located in CDC1 in various embodiments, as well as with other VMs that are set up in the provider network data centers, as desired. At least some VMs that are set up at the ERG, and associated higher-level services that use such VMs as building blocks, may continue to function even during periods of time when connectivity to the provider network data centers is temporarily disrupted in some embodiments. Especially for VCS customers that wish to access and process large amounts of application data that is stored at customer data centers (e.g., for legal compliance, security or other reasons) with low latencies, the ability to set up VCS VMs co-located with the application data may be highly beneficial in various embodiments.

As one skilled in the art will appreciate in light of this disclosure, certain embodiments may be capable of achieving various advantages, including some or all of the following: (a) enabling a wide variety of virtualized computing applications to be implemented in a location-independent manner, e.g., using resources located at premises selected by clients of a virtualized computing service, while still retaining the scalability, security, availability and other operational advantages made possible by using a provider network, (b) reducing the amount of application data and results that have to be transferred over long distances, such as over links between customer data centers and provider network data centers, (c) improving the overall latencies and responsiveness of applications for which potentially large amounts of data may be consumed as input or produced as output, by moving the applications close to the data sources/destinations, and/or (d) improving the security of sensitive application data. In various embodiments, guiding principles and goals underlying the design and implementation of extension resource groups (ERGs) may include, among others: (a) making lowered-latency computations possible, based on taking advantage of locality of compute and data resources, (b) ensuring customer data security by restricting and thoroughly logging network traffic to locations at which the customer data is stored, (c) providing first-class support for a variety of provider network services using ERG resources (equivalent to the support possible using resource located in the provider network data centers), (d) protecting the provider network's own data centers from potential hostile actors (e.g., operating from an ERG), and/or (e) supporting continued fulfilment of services at ERGs even under conditions of imperfect network connectivity to the provider network from the ERG.

In order to achieve the targeted high level of security for customer data and applications, and for the provider network, a number of network configuration techniques (as well as other types of configuration settings) may be utilized in different embodiments, involving the use of isolated virtual networks and virtual network interfaces (VNIs). An isolated virtual network (IVN), as suggested by the name, may comprise a set of resources that is logically isolated or separated from the rest of the resources of the virtualized computing service with respect to at least some types of networking configuration settings in various embodiments. IVNs may be established at or by a virtualized computing service (and in some cases extended to ERGs located outside the data centers of the provider network) for a variety of purposes. For example, an IVN may be set up for a particular customer by setting aside a set of resources for exclusive use by the customer, with substantial flexibility with respect to networking configuration for that set of resources being provided to the customer. Within their IVN, the customer may set up subnets, assign desired private IP addresses to various resources, set up security rules governing incoming and outgoing traffic, and the like. At least in some embodiments, by default the set of private network addresses set up within one IVN may not be accessible from another IVN (or more generally from outside the IVN). In at least some embodiments, one of the security mechanisms used for extending the VCS to non-provider-network premises may involve setting up one or more IVNs (using resources at provider network data centers) comprising a pool of instances of outbound command communicators (OCCs). Such communicators, which may be kept logically (and/or physically) separated from the servers and devices of the VCS control plane, may be used to transmit administrative commands from the VCS control plane to the ERGs using secure networking channels in various embodiments. The OCCs may also be configured so as to ensure that administrative messages cannot be directed back to the control plane from the ERGs via the secure networking channels in various embodiments, thus preventing administrative operations that could affect other customers from being initiated at the ERG of any given customer. In at least some embodiments, an individual OCC instance may comprise a virtual machine, with one or more virtual network interfaces attached to the virtual machine as discussed below in further detail. A virtual network interface (VNI) may comprise a set of networking properties, including public and/or private IP (Internet Protocol) addresses, security settings, and the like that can be programmatically attached or associated with virtual machines in various embodiments. Details of the manner in which OCC instances, IVNs and VNIs may be utilized to secure the virtualized computing capabilities provided via ERGs are provided below.

According to some embodiments, a system may comprise one or more computing devices of a virtualized computing service (VCS) of a provider network. The provider network may comprise one or more data centers. The computing devices may include instructions that upon execution on a processor cause the computing devices to instantiate, within a first isolated virtual network (IVN), an outbound command communicator (OCC) associated with an extension resource group (ERG). The ERG may comprise at least a first virtualization host located at a first premise external to the one or more data centers of the provider network in some embodiments. An OCC may serve as an intermediary that forwards administrative commands securely to the ERG, without allowing commands to be submitted from the ERG in various embodiments. For example, configuration settings may prevent at least some types of network packets from the ERG from being transmitted via the OCC to a control plane of the VCS. The instructions when executed may also cause the computing devices to obtain, at the OCC, an indication of a secure network channel (e.g., a VPN or Virtual Private Network tunnel or connection, or a connection whose traffic flows over a dedicated physical link) established between (a) a portion of a second isolated virtual network comprising resources at the one more data centers of the provider network, and (b) one or more resources located at the first premise external to the provider network. Such a secure networking channel may, for example, be established between an ERG network manager and a customer IVN within the data centers of the provider network.

At the OCC, a virtual machine launch command (generated in response to a programmatic request from a VCS client) may be obtained or determined in various embodiments. The programmatic request from the client may be received at the control plane of the VCS from the client via a pathway that does not include the secure network channel in at least some embodiments—e.g., the command may be submitted at a web-based console and transmitted via the same kinds of paths that are used for administrative commands submitted by clients with respect to virtual machines set up within the provider network data centers. The instructions upon execution may cause the computing devices to transmit a representation of the virtual machine launch command via the secure network channel to the extension resource group from the first OCC in various embodiments. In at least some embodiments, processing of the representation at the first virtualization host may result, at least in part, in an instantiation of a virtual machine at the first virtualization host. Because of the way that configuration settings restrict the flow of commands to only the outbound direction from the VCS control plane to the ERGs, the security of the VCS and its customers may be enhanced in various embodiments, as no commands may be submitted from the ERGs that can affect operations at the VCS data centers or at other ERGs. In addition to the virtual machine launch command, other administrative commands (e.g., commands to shut down virtual machines at the ERG, view or change the properties of virtual machines at the ERG, etc.) may also be transmitted from the VCS control plane on behalf of customers using the OCC and the secure network channel established with the ERG.

In at least some embodiments, an OCC may be set up in advance of the time at which the hardware equipment of the ERG is delivered at the premise selected by a client. For example, in one embodiment, there may be a delay between the time that a VCS customer orders an ERG via a programmatic request, and the time that the ERG hardware is delivered and set up at the premise, and the receipt of the programmatic request to establish the ERG may trigger the proactive configuration or instantiation of an OCC specifically designated for that customer's ERG. A unique identifier may be generated for each ERG request and stored in a metadata entry accessible from the OCC designated for the ERG in some embodiments; that identifier may also be included in one of the hardware devices shipped as part of the ERG, so that the ERG van be matched up with the correct OCC when connectivity is established between the VCS and the ERG. In at least some embodiments, a network manager at the ERG may initiate the establishment of a secure network channel (such as a VPN tunnel) with the VCS, and the OCC may be instantiated in advance of the request to establish the secure network channel. In some embodiments, the OCC may be implemented using a virtual machine within the data centers of the provider network.

In at least some embodiments, the control plane of the VCS at a service provider environment may use a particular range of service network addresses SAR1 for virtualization hosts (regardless of whether the virtualization hosts are located within the service provider's data centers, or are part of ERGs set up at client premises). Within provider network data centers, a network managed by the control plane may include a plurality of servers configured to host compute instances. Using virtual network interfaces (VNIs) as described below and/or other techniques, in at least one embodiment an address Addr1 assigned by the control plane to a target virtualization host H1 of an ERG may also be assigned to the particular OCC which is used to forward control plane commands to the ERG. In such an embodiment, from the perspective of the control plane, the OCC (which may be configured within, or coupled to, the same network as the virtualization hosts at the service provider data centers) may in effect represent the host H1. Using Addr1 as a destination address, a first message which includes a request to launch a compute instance at the ERG may be sent to the OCC from the control plane in at least some embodiments.

In some embodiments, the network manager (ENM) of the targeted ERG may be running at one or more devices (e.g., a hardware card as discussed above) to which at least a second network address Addr2 may have been assigned. Addr2 may, for example, be an address within a first network established at a customer data center or other client premise, which uses a client address range CAR1 for its devices. In response to receiving the first message from the control plane at Addr1, the OCC may prepare a second message, which includes at least a portion of the request to launch the compute instance, and send this to the ENM with Addr2 as the destination address in various embodiments. Upon receiving the second message, a device at which the ENM runs may forward at least a portion of the second message (e.g., indicating that the compute instance is to be launched) to the target virtualization host H1. In some embodiments, at least two networks may be established at the client premise (e.g., a customer data center): a first network which uses the address range CAR1, and a second network (which may be a private network set up by the ENM) in which various hosts/servers such as H1 are assigned addresses from at least a sub-range of SAR1 (the address range used for virtualization hosts by the control plane). In such an embodiment, the target virtualization host H1 may be assigned the same address Addr1 that was assigned to the OCC, and the ENM may send the launch message to the target virtualization host using Addr1 as the destination address. In effect, the command/request to launch the compute instance, which was originally directed to destination address Addr1 by the control plane, but may have been transmitted using one or more other addresses as the destination along the path to the ERG, may once again be sent to destination address Addr1 within the ERG; as such, at least two address translation operations may be involved in the transmission of the command in some embodiments. The ENM itself may be part of both networks of the client premise in some embodiments—e.g., a device at which at least a portion of the ENM runs may be assigned respective addresses within the network in which CAR1 is used, and also within the network comprising H1 (in which SAR1 is used). When the host H1 receives the message sent by the ENM, the requested operations may be performed, e.g., a compute instance may be launched at H1.

In at least some embodiments, the VCS may provide an indication of a set of virtual machine categories, of which a desired number of instances may be established at provider network data centers and/or at ERGs at the request of VCS clients. Thus, for example, a client C1 may request N VMs of category Cat1 at the provider network data centers, and also M VMs of the same category Cat1 at an ERG set up on behalf of C1. In some embodiments, at least some categories of VMs may only be supported at ERGs, or may only be supported at provider network data centers.

An OCC may perform one or more transformations on a virtual machine configuration command (e.g., a launch command) before forwarding a representation of the command to an ERG in some embodiments. For example, the version of the command obtained at the OCC from the VCS control plane may comprise one or more security tokens (e.g., tokens that can be used to verify the identity of the requester of the operation performed as a result of the command, and that the requester has the permissions required to request the operation) in some embodiments, and the OCC may strip or exclude the tokens from the version of the command forwarded on to the ERG. In at least some embodiments, the original security tokens may be transformed (e.g., signed using a different key than was used initially at the VCS control plane), and a transformed version of the security tokens, which can be authenticated at the target host to which the command is directed by the VCS control plane may be included in the forwarded version of the command. In at least one embodiments, respective message authentication codes (including for example hash-based message authentication codes or HMACs) may be generated for the outbound commands sent from the OCC to the ERG. In various embodiments, the OCC may log all outbound communication messages sent to a given ERG, and the logged messages may be examined by the client in whose behalf the ERG is set up if desired. In some embodiments, at least two virtual network interfaces may be associated with a given OCC—one that is used to obtain commands from the VCS control plane, and one that is used to communicate with the ERG using the secure network channel.

According to some embodiments, a system may comprise an extension resource group (ERG) of a virtualized computing service (VCS) of a provider network. The ERG may include at least a first virtualization host (VH) comprising a tamper-resistant storage device (e.g., an encrypted device that can only be decrypted if it is physically attached to the host) and a trusted platform module in various embodiments. The provider network may comprise one or more data centers, and the first VH may be located at premises external to the provider network in at least some embodiments. The computing devices may include instructions that upon execution on a processor cause the computing devices to instantiate, in response to one or more trigger signals, a network manager of the ERG. The ERG network manager (ENM) may initiate configuration of a secure network channel for communication with one or more VCS resources, such as at least a portion of a first isolated virtual network (IVN) of the VCS, in various embodiments. Such an IVN may for example comprise at least a first virtual machine (VM) at a second VH instantiated at a data center of the provider network.

The ENM may obtain, via the secure network channel, a virtual machine launch command from an OCC associated with the extension resource group in at least some embodiments. The virtual machine launch command may be generated (e.g., at the VCS control plane) in response to a programmatic request from a client, which was transmitted via a pathway that does not include the secure network channel in various embodiments. From the ENM, at least a version of the virtual machine launch command may be transmitted to the first virtualization host of the extension resource group in some embodiments. Processing of the virtual machine launch command at the first virtualization host may result in an instantiation of a new virtual machine at the first virtualization host in such embodiments.

Any of several types of trigger signals may lead to the instantiation of the ENM in various embodiments. For example, a signal indicating that a particular server that is included in the ERG has been powered on, or that connectivity to the Internet from the ERG has been enabled, may lead to instantiation, initialization and/or startup of at least a portion of the ENM in some embodiments.

In addition to be acting as an intermediary between the ERG and the VCS resources at the provider network, in at least one embodiment an ENM may also act as an intermediary between virtual machines set up within the ERG and resources that are (a) located at the premises at which the ERG is set up and (b) not part of the ERG. For example, a VCS client may have a set of servers, separate from the ERG, on which data that is be processed using ERG virtual machines is stored, and the ENM may enable communications between that set of servers and the ERG virtual machines. Such servers may be referred to as non-VCS servers in at least some embodiments. In order to provide connectivity, the ENM may perform various types of packet transformations on traffic outbound from the ERG to the non-VCS servers, and the reverse transformations on traffic inbound from the non-VCS servers to the ERG in some embodiments. The transformations may involve for example IP address mappings, encapsulation protocol processing, and the like in different embodiments. In some embodiments, different entities may be responsible for managing ERG-to-VCS communications than are responsible for managing ERG-to-non-VCS-resources at the premises at which ERGs are hosted—that is, a single ENM may not necessarily be responsible for both types of functions.

According to one embodiment, an ERG may also comprise a bootstrapping manager responsible for initializing/booting virtualization hosts of the ERG. In some embodiments, an ENM may perform the bootstrapping/initialization tasks. In at least some embodiments, after VMs have been established at ERG hosts, operations of other higher-level services of the provider network may be performed using those VMs. For example, the provider network may comprise a database service whose database instances are configured using VMs as building blocks, and such database instances may be configured using the VMs set up at an ERG.

In at least some embodiments, the virtualization hosts of an ERG may comprise security modules such as Trusted Platform Modules (TPMs), and such security modules may be used to verify, prior to instantiating a VM (or performing other virtualization-related operations) at a given ERG host, that the state (e.g., installed software state) of the ERG host meets an acceptance criterion. In at least one embodiment, state information pertaining to a VM launched at an ERG virtualization host may be stored in encrypted form at a storage device of the virtualization host. A tamper-resistant storage device may be employed in some embodiments, such as a storage device that can only be decrypted as long as it is physically present in or attached to a particular virtualization host of the ERG. As a result, if a nefarious actor were to physically remove the storage device, the encrypted state information may not be decrypted from the removed device in such embodiments, further enhancing the security of the virtualization features supported by the ERG.

In some embodiments, for a given ERG, a set of users or entities defined at an authorization or identity management service may be designated, such that only those users/entities are permitted to set up and use virtual machines at the ERG. Before a given VM is launched at the ERG (or other VM-related operations are performed), the identity of the requesting user or entity may be verified in various embodiments, e.g., at the ENM, the OCC, or the virtualization host at which the VM is to be launched. In at least one embodiment, in order to help speed up the launches of VMs at ERGs, a set of VM images may be stored or cached in local storage devices of the ERG; as a result, it may not be necessary to transfer large images over the network to launch a desired category of VM at an ERG. In some embodiments, the images may be cached prior to the physical delivery of the computing devices of the ERG to the location (e.g., a customer data center) where the ERG is to be set up.

Example System Environment

FIG. 1 illustrates an example system environment in which extension resource groups of a virtualized computing service of a provider network may be set up using resources located at premises external to the provider network, according to at least some embodiments. As shown, in system 100 the core components of a virtualized computing service (VCS) 110 may comprise at least a set of control plane resources 141, data plane resources 145 and outbound command communicators (OCCs) 177, all of which may be located within data centers of a provider network 101. The provider network may be referred to as a service provider in various embodiments. The data plane of the VCS may be extended into external locations (premises that may be selected by VCS customers/clients) using extension resource groups (ERGs) in the depicted embodiment. For example, ERG 135A may be established in a co-location facility 130 (e.g., a location such as a building or room in which computing-related resources of more than one organization may be hosted), ERG 135B may be set up at a customer data center 132A, and ERG 132B may be established at customer data center 132B.

According to some embodiments, the control plane resources 141 of VCS 110 may include a number of control plane servers (CPSs) 102 such as CPSs 102A-102C responsible for responding to client-submitted configuration requests (such as requests to set up new virtual machines, change network settings, and the like), provisioning and health management operations of the data plane components of the VCS, and so on. The data plane resources may include a number of isolated virtual networks (IVNs) 115, such as IVN 115A set up on behalf of client C2. An IVN 115, as indicated earlier, may comprise a set of resources that is logically isolated or separated from the rest of the resources of the virtualized computing service with respect to at least some types of networking configuration settings in various embodiments. For example, a given IVN may have one or more subnets with respective security settings, and/or a set of IP addresses, individual ones of which may be assigned to individual virtual machines 125 (e.g., VM 125A) set up at one or more virtualization hosts (VHs) 117 in some embodiments. In the example scenario shown in FIG. 1, IVN 115A may include virtual machines instantiated at VH 117A and VH 117B, while IVN 115B may include virtual machines set up at VHs 117J or 117K. Note that at least in one embodiment, at least some virtualization hosts 117 may be used in a multi-tenant mode, so a given VH may potentially be used for VMs set up on behalf of several different clients, with VMs of several different IVNs potentially being instantiated on one VH.

In at least one embodiment, IVNs may be set up for internal or administrative use as well as for hosting client-requested virtual machines. In some embodiments, for example, one or more of the OCCs 177 used for transmitting commands to ERGs may be established within an IVN. A given OCC 177 may, for example, be implemented using one or more processes or execution threads within a virtual machine in some embodiments, and may be programmatically associated with at least one extension resource group 135. In at least some embodiments, configuration settings of an OCC may be set up such that while commands originating within the VCS control plane may be transmitted via the OCC to an ERG, messages originating at the ERG (or any other source) may not be transmitted via the ERG to the VCS control plane. For example, as discussed below, in one embodiment security settings of a particular virtual network interface (VNI) attached to a virtual machine being used as an OCC may only allow messages to be transmitted from the VCS control plane resources 141 to the OCC, and not in the reverse direction.

At a high level, in various embodiments ERGs 135 may be designed to provide secure data plane functionality of the VCS (e.g., the ability to instantiate virtual machines identical to, or at least very similar to, those that can be set up within provider network data centers) at any location selected by a VCS customer that is capable of hosting at least a small amount of hardware equipment and has Internet connectivity. As discussed below, one or more types or categories of ERGs may be defined at the VCS in various embodiments, and customers may select the particular category of which an ERG instance is to be set up at a given location external to the provider network, such as a co-location premise 130 or a customer data center 132. The specific set of hardware devices, associated software and firmware that are included within an ERG may meet criteria set by (and at least in some cases be pre-configured or pre-installed by) the operator of the provider network 101 in various embodiments.

A number of techniques may be used to ensure that the quality of virtualized computing and other functionality that is provided using the ERGs (including aspects such as security, performance, availability, and the like) meets the standards of the VCS and the provider network in different embodiments. For example, in at least some embodiments, a set of enhanced security virtualization hosts (EVHs) 118 such as EVH 118A, 118B, 118J, 118K, 118P or 118Q may be included in an ERG. Such EVHs may comprise a number of hardware, software and/or firmware elements that are especially designed to enable remotely generated virtualization-related administrative commands to be executed in a safe and secure manner, without for example requiring messages to be sent back to the sources (such as control plane resources 141) from which the command were originally issued. In some embodiments, such elements may include offloaded virtualization management components (OVMCs) that include trusted platform modules (TPMs) or other security modules, tamper-resistant storage devices whose contents can only be decrypted as long as the storage devices are physically attached to a particular EVH, a low-overhead virtualization management software stack, and so on, as discussed below in further detail. In at least some embodiments, as discussed below, an EVH may comprise a VCS control plane agent that does not make outbound calls and implements an API for inbound commands that is protected using TLS (Transport Layer Security) sessions. Such an API may have strong authorization, authentication and accounting-related controls in various embodiments. In at least some embodiments, no shared secrets associated with virtualization management may be stored within an EVH itself. In various embodiments, state information on the EVH, including VCS software and configuration may be stored in one or more encrypted drives that are sealed against a TPM or a similar security module, and a secure and measured boot process may be used to unlock the contents of the drives. Note that at least in some embodiments, similar EVHs may be used within provider network data centers as well—e.g., at least some subset of the virtual machines such as 125A may be set up on EVHs within the provider network. Virtualization hosts (including EVHs 118 and VHs 117 of FIG. 1) may also be referred to as virtualization servers, or simply as servers, in some embodiments.

In at least some embodiments, a given ERG 135 may include a network manager implemented at one or more computing devices, which may participate in or initiate the establishment of network connectivity with the provider network. In some embodiments, a secure network channel, such as a virtual private network (VPN) tunnel or VPN connection, may be established between an ERG 135 (e.g. a network manager of the ERG) and resources located within the provider network data centers, and such a channel may be employed for sending commands from the VCS to the ERG. In the embodiment depicted in FIG. 1, for example, respective one way secure network channels 166 (e.g., 166A, 166B or 166C) may be used to transmit commands originally generated at the control plane resources 141 in response to client requests (including requests to instantiate virtual machines 125, such as 125B, at an ERG) via an OCC to the ERG for eventual execution at an EVH 118. In one embodiment, a secure channel to be used for such commands may be set between one or more resources at an ERG 135 (such as a network manager) and one or more resources within an IVN 115 of the client at whose request the ERG was established (such as a virtual machine 125 or a VPN gateway), and the OCC 177 designated for that ERG 135 may obtain an indication of (and permission to use) the channel (e.g., a VPN connection identifier or tunnel identifier) after it has been set up.

According to some embodiments, an OCC 177 which has access to a secure channel 166 may obtain at least a first version of an administrative command generated at the VCS control plane resources 141. The administrative command may have been generated at the VCS control plane in response to a programmatic request from a client in at least one embodiment, and may be directed to an ERG associated with the OCC. The programmatic request itself may have been received at a control plane device from the client via a pathway that does not include the secure network channel in at least some embodiments. A representation of the command generated at the VCS control plane may be transmitted from the OCC via the secure network channel to the associated ERG 135, and executed at the ERG in various embodiments. In one example scenario, the client may programmatically submit a request to launch a virtual machine (such as VM 125B) at an ERG, a first version of a corresponding VM launch command may be generated at the VCS control plane resources 141 and transmitted to the appropriate OCC 177, and the OCC 177 may transmit a modified version of the command to a network manager of the ERG. The network manager may in turn transmit the command to a selected EVH 118, and one or more processes on the EVH 118 may execute the command to launch the request virtual machine. Similar workflows may be executed for other types of commands, such as commands to terminate a VM, modify a VM, and so on in various embodiments.

In some embodiments, the version of a command received at an OCC from the VCS control plane may be modified at the OCC, e.g., by removing/substituting one or more security-related tokens and the like, resulting in the transmission of a modified version of the command to the ERG. The modified version of the command may include one or more security artifacts or objects, generated for example at the OCC, which can be authenticated at the target host at the ERG where the command is eventually performed/implemented in various embodiments. In at least one embodiment, respective authentication codes such as HMACs (hash-based message authentication codes) may be generated for each command at the OCC and included in the message forwarded to the ERG, rendering it difficult to tamper with the commands. In some embodiments, instances of one or more families of virtual machine categories may be established at the virtualization hosts 115 within provider network data centers, and instances of at least some of the same VM categories may be set up at ERGs. In one embodiment, virtual machine images that can be used to launch instances of one or more VM categories may be cached at storage devices included within an ERG, so that for example new VMs may be launched very quickly without having to transmit potentially large VM image files over a network from the provider network to an ERG. In some embodiments, a set of authorized entities (e.g., users, groups and the like, defines within an identity service or an authorization service) may be designated for a given ERG, such that only those entities are permitted to initiate one or more types of operations (such as VM launches) at the ERG. Prior to performing such an operation, the VCS may verify (e.g., at the VCS control plane, at the OCC, and/or at the ERG itself) that the requesting entity has been granted the appropriate permission in various embodiments. In at least some embodiments, a comprehensive log of all the commands issued to (or more generally, messages sent to and/or from) an ERG may be maintained, e.g., at the VCS control plane, at a OCC and/or at a network manager within the ERG, and the contents of such logs may be provided via various types of programmatic interfaces to the VCS clients on whose behalf the ERG is set up.

In at least some embodiments, data plane communications of at least two kinds may be supported with respect to virtual machines 125 running at an EVH of an ERG 135. A given external premise, such as customer data center 132A of client C1, customer data center 132B of client C2, or co-location facility 130 may include at least some servers or computing devices that do not implement VCS functionality. For example, co-location facility 130 may comprise a set of non-VCS servers 123A, data center 132A may include non-VCS servers 123B, and data center 132B may include non-VCS servers 123C in the depicted embodiment. In some cases, one of the motivations for setting up an ERG 135 may include proximity to a given set of non-VCS servers 123; such servers may for example store data that is to be manipulated using virtual machines of the ERG, or may run applications that are intended to work closely with other applications running within an ERG, but may not be part of the ERG (and not part of the provider network). As such, in various embodiments, a given ERG 135 may include one or more resources that enable connectivity to non-VCS resources via local-premise low-latency data channels 168 (e.g., channels 168A at data center 132A, channels 168B at data center 132B, and channels 168C at co-location facility 130). In some embodiments, for example, network address translations may be needed for traffic between virtualization hosts at EVHs 118 (which may for example be assigned private IP addresses of a range associated with an IVN of the VCS), and the non-VCS resources such as servers 123 at the ERG-hosting premise. In at least one embodiment, a network manager of the ERG 135 may serve as an intermediary for performing such address translations and/or other protocol processing (e.g., encapsulation protocol processing) operations for such traffic. In some embodiments, the same network manager that participates in setting up the secure channels 166 to the VCS control plane may also be used for enabling connectivity to the non-VCS resources; in other embodiments, different network managers may be used for the different types of traffic.

In at least some embodiments, a given ERG 135 may be configured as a logical extension of an existing IVN 115 established using at least some resources within the VCS data centers. For example, in the depicted embodiment, ERG 135B is an extension of IVN 115A of client C1, and ERG 135A is an extension of IVN 115B of client C3. As such, various networking configuration settings of the IVN, such as the available range of IP addresses, subnet settings, egress/ingress security rules and the like, may also be applied to the ERG which extends the IVN in such embodiments. In various embodiments, two-way data channels such as 167A and 167B may be used to transmit non-administrative or data plane packets between resources within the IVNs and the ERGs that are configured as extensions of the IVNs. Note that some ERGs, such as ERG 135C, may not be configured as extensions of IVNs in some embodiments. Such ERGs may in effect be considered the logical equivalent of IVNs implemented outside the provider network data centers; for example, similar types of networking configuration choices may be made by client C3 within ERG 135C as could be made within an IVN set up on behalf of C3 in the depicted embodiment. Note that at least in some embodiments, the same set of physical network links and/or the same VPN tunnel or other secure connection may be used both for (a) two-way data traffic (e.g., a logical two-way data channel 167) and (b) one-way administrative command traffic (e.g., a logical one-way command channel 166).

According to some embodiments, a VCS client may initiate the workflow of setting up and configuring an ERG by submitting a programmatic request to the VCS. In response to such an ERG establishment request, in one embodiment an outbound command OCC may be configured, selected, e.g., from a pool of pre-existing OCCs) or instantiated, e.g., even before the physical equipment of the ERG has been delivered to the appropriate premise. In such a scenario, the secure channel 166 (e.g., a VPN tunnel) with the ERG 135 may be set up at some time after the OCC has been established or designated for the ERG.

In some embodiments, the devices of an ERG may be pre-configured and pre-installed in such a way that very little effort may be required from VCS customers to establish connectivity and start using the ERGs. For example, in one embodiment, as soon as a set of computing devices of an ERG instance is set up, powered on and connected to the Internet, a network manager may automatically start up at one or more of the devices and initiate connectivity with resources (such as OCCs 177, gateways set up to enable VPN tunnels, etc.) at the VCS data centers. The discovery that power and/or an Internet connection is available may thus serve as a trigger signal to start up the network manager in such embodiments. The network manager may in some embodiments also be responsible for initiating bootstrap operations of one or more of the EVHs of an ERG. In addition to enabling the instantiation and use of virtual machines 125 on EVHs, an ERG may also be used in some embodiments to provide the functionality of provider network services that utilize the virtual machines. For example, in some embodiments a database service of the provider network may utilize a set of virtual machines for instantiating a database instance, and such database instances may also be set up at an ERG at the request of a client.

Example ERG Virtualization Hosts

Figure 2:
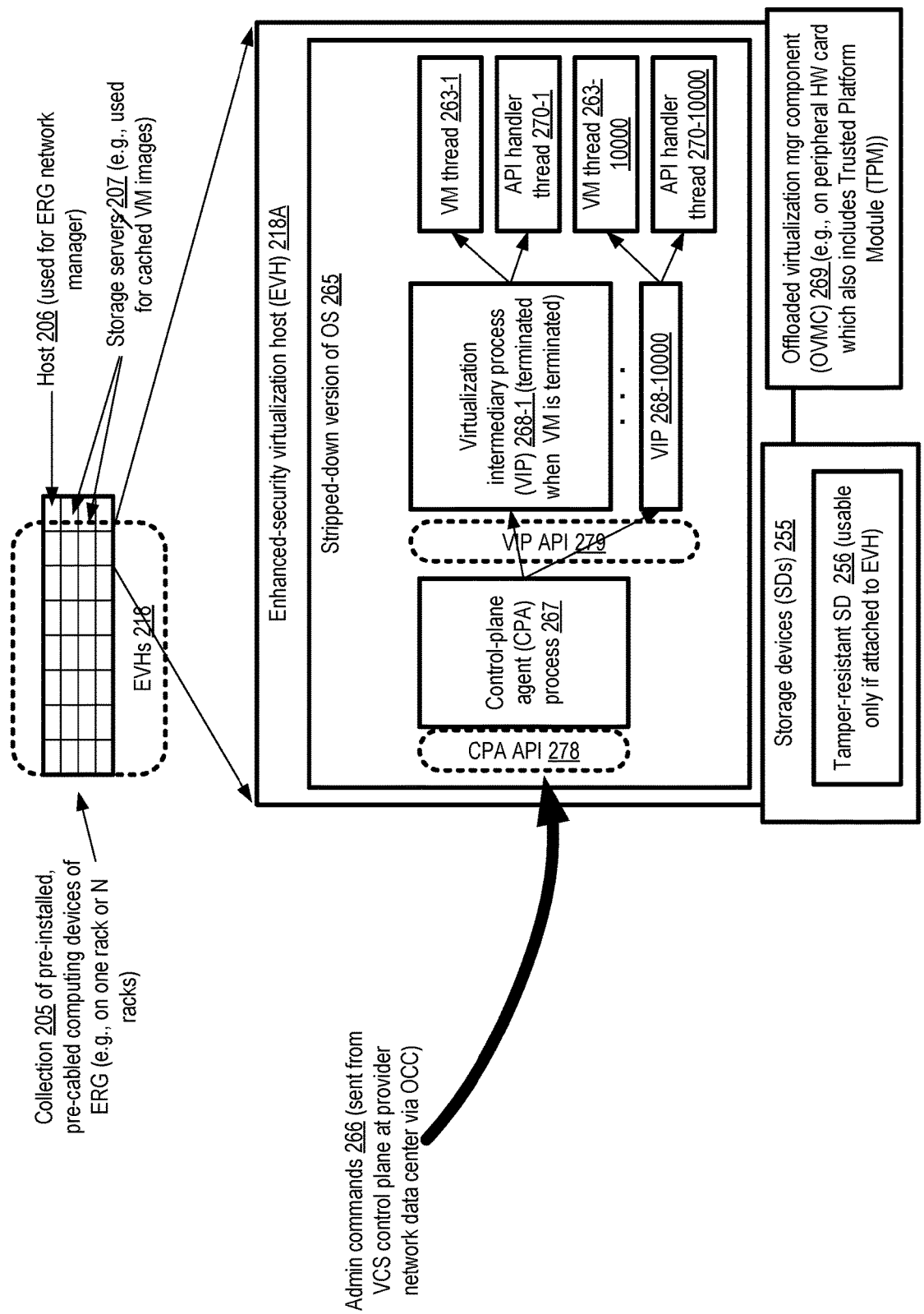
FIG. 2 illustrates an example overview of an enhanced-security virtualization host that may be included in an extension resource group of a virtualized computing service, according to at least some embodiments.

FIG. 2 illustrates an example overview of an enhanced-security virtualization host that may be included in an extension resource group of a virtualized computing service, according to at least some embodiments. In the depicted embodiment, a collection 205 of computing devices of an ERG similar to the ERGs 135 shown in FIG. 1 may be delivered to a location (e.g., a customer data center, a co-location facility or the like) selected by a VCS client. Individual devices of the collection may have a set of software and firmware selected by the VCS operator already installed, and may also be pre-cabled to one another in at least some embodiments. In at least one embodiment, the collection of devices may fit on a single standard rack of the kind typically installed in data centers (or on some other number of racks), and the entire rack (or racks) may be packaged as a unit and provided by the VCS operator to the designated location external to the provider network. In the depicted embodiment, the ERG device collection 205 may comprise one or more hosts 206 that are used for an ERG network manager, which in effects act as the primary administrator for the ERG, responsible for establishing connectivity to the VCS data centers and non-VCS servers at the location in which the ERG is installed, booting up the other devices of the ERG, and so on. In some embodiments, the collection 205 may include one or more storage servers 207, which may for example be used as caches of virtual machine images which can be used to instantiate customer-requested virtual machines at the ERG, without having to transfer the images over a network connection from the VCS. The collection may also include some number of enhanced-security virtualization hosts (EVHs) 218, such as EVH 218A in the depicted embodiment. Note that in at least one embodiment, the same type of computing devices may be used at an ERG for the EVHs, the ERG network manager and/or for storage servers—that is, special types of hardware may not be required for the network manager and/or for caching VM images.

In at least some embodiments, a given EVH of the ERG, such as EVH 218A, may comprise a set of storage devices 255, an offloaded virtualization manager component (OVMC) 269, and a stripped-down version 265 of an operating system (OS). The storage devices 255 may for example comprise at least one tamper-resistant device 256 on which state information of the EVH, including state information of any virtual machines launched at the EVH, may be stored e.g., in an encrypted form. In at least one embodiment, a tamper-resistant storage device 256 may be configured such that the encrypted data stored in the device may only be decrypted as long as the device is physically attached to a specific EVH (e.g., EVH 218A)—for example, information stored in a security module such as a TPM (trusted platform module) of the EVH may have to be read and/or analyzed in order to decrypt the encrypted version of the data stored at the device. The offloaded virtualization manager component 269 may include the security module in some embodiments, as discussed below in the context of FIG. 3. The OVMC may, for example, comprise a hardware card attached via a peripheral interface such as PCI (Peripheral Component Interconnect) to the memory of the EVH 218 in some embodiments. As indicated by the name, the OVMC may offload some of the work of managing virtual machines from the primary processors (e.g., CPUs) of the EVH, thereby leaving more of the resources of the EVH available for client-requested virtual machines. In some embodiments, multiple OVMCs (e.g., multiple PCI-attached cards) may be included in an EVH such as 218A. In one embodiment, an OVMC may perform networking-related virtualization management tasks and/or other input-output (I/O) related virtualization management tasks. In at least one embodiment, a peripheral card similar to OVMC 269 may be used to implement at least a portion of the functionality of a network manager of an ERG.

In the embodiment depicted in FIG. 2, the OS 265 may comprise a control plane agent (CPA) process 267. The CPA 267 may receive administrative commands 266 sent from the VCS control plane at a provider network data center via an outbound command communicator (OCC) of the kind discussed above. The commands 266 may be formatted in accordance with a set of CPA application programming interfaces (CPA API) 278 in the depicted embodiment. In effect, the CPA API 278 may represent a contract governing the types of operations that are to be implemented at an EVH 218 at the request of the VCS control plane, regardless of the specific implementation details of the CPA or other components of the EVH 218. For example, a command to launch a virtual machine requested by a client on whose behalf the ERG is set up may be transmitted to the CPA 267. At least some CPA API calls may not require responses to be transmitted to the submitter in the depicted embodiment. Outbound messages may not be transmitted from the EVH by the CPA in some such embodiments.

In response to a VM launch command, the CPA 267 may in some embodiments launch a swappable virtualization intermediary process (VIP) 268, such as VIP 268-1. Initially, in the depicted embodiment, the VIP process 268-1 may comprise an API handler thread 270-1, which is configured to receive API requests or commands issued by the CPA 267. The CPA 267 may then issue a command to actually launch a VM, and a new child thread 263-1 of the VIP 268-1 may be launched to implement the requested VM. The command that results in the launching of the VM thread 263-1 may include parameters indicating for example the bootable VM image to be used, the resource requirements for the VM, the results of network configuration operations performed earlier by the CPA specifically for the VM using an OVMC, and so on. The command to instantiate a VM may be submitted via a second internal API, referred to as the VIP API 279 in the depicted embodiment. Just as the CPA API represented a contract between the VCS control plane and the CPA, in various embodiments, the VIP API may represent another contract indicating the types of requests that are to be processed by an entity that is responsible for launching and terminating VMs, regardless of the specific implementation details or process/thread structure of the entity (e.g., the VIP). The lifetime of a given VIP 268 may coincide with the lifetime of the corresponding VM thread 263 in some embodiments—e.g., when the VM is terminated, the VIP may also be terminated. During the lifetime of the VM, the CPA may communicate with the VIP via its API handler thread 270-1, e.g., submitting messages formatted according to VIP API 279 requesting various types of VM-related operations and submitting various types of VM-related queries, and receiving corresponding responses. In some embodiments, the resource requirements (e.g., CPU, memory, storage and/or memory requirements) of at least some of the VMs launched at an ERG may be quite low, and/or the expected lifetimes of the VMs may be quite short, and such VMs may be referred to as "micro-VMs". In one embodiment a stripped down version of OS 265 may include a virtual machine monitor which can leverage the Linux Kernel-based Virtual Machine (KVM), and other virtualization features, to run such lightweight micro-VMs at near-native speeds. The virtual machine monitor may run as a user-space process and provide minimal device emulation to the guest operating system (e.g., a standard PC device model including a block and network devices), and may not include non-essential functionality (e.g., VGA (Video Graphics Array) and other legacy device emulators) to achieve faster startup and a reduced memory footprint. The virtual machine monitor process may expos an API similar to CPA API 278, enforcing micro-VM sandboxing, and handling rate limiting of virtualization-related requests in some embodiments.

A number of VM placement factors may be taken into account when selecting the particular EVH 218 to be used for a given requested VM in different embodiments—e.g., the number of VMs currently running on the host may be considered, the mix of resource usage characteristics of the VMs running on the host may be considered, over-subscription settings of the EVH and/or over-subscription preferences of the client on whose behalf the VM is to be launched may be considered, and so on. In some embodiments, some preliminary configuration operations may be performed on the EVH 218 (e.g., by the ERG network manager) before any requests for specific VM launches are sent to a CPA 267 at the EVH—e.g., one or more virtual network interfaces of the kind discussed below may be configured, using an OVMC 269, for eventual use by the VMs of the EVH.

As new commands to launch VMs are received at the CPA 267, the CPA workflow indicated above with respect to the launch of the VM thread 263-1 may be repeated in the depicted embodiment—e.g., VM specific configuration operations may be performed by the CPA prior to launching a VIP, and one of the threads of the VIP may be used for the requested VM. As suggested by the label VIP 268-10000, a large number (e.g., tens of thousands) of VMs may be created at a given EVH 218 in the depicted embodiment. Note that the actual number of VMs that can be instantiated to run concurrently at an EVH may differ in different embodiments, depending for example on the overall resource mix available at the EVH, the version of the software/hardware stack installed, the resource oversubscription policy/policies in effect, and so on, and may be larger or smaller than the 10000 number shown in FIG. 2 by way of example. Because the parent VIP 268-1 of the VM 263-1 is swappable, it may be possible to implement desired levels of resource oversubscription in the depicted embodiment at EVH 218A—e.g., the total memory usage of the set of VMs running at the EVH may exceed the amount of memory available. When a request to terminate a VM is received at the VCS control plane, a corresponding command may be transmitted via an API invocation to the CPA, and the VIP whose thread is used for the targeted VM may be terminated in the depicted embodiment. That is, in at least one embodiment, there may be a 1-to-1 relationship between the number of running VMs and the number of running VIPs. In other embodiments, a variation of the process architecture shown in FIG. 2 may be employed—e.g., a given VIP may spawn multiple VMs as respective threads, multiple CPAs may be set up at the VH, and so on. In some embodiments the VIP and/or a separate process used for a VM may not be swappable. In at least some embodiments a different approach than that shown in FIG. 2 may be used to manage virtual machines—e.g., instead of a control plane agent of the kind shown, a hypervisor with a larger footprint may be used.

Example Offloaded Virtualization Management Component Card

Figure 3:
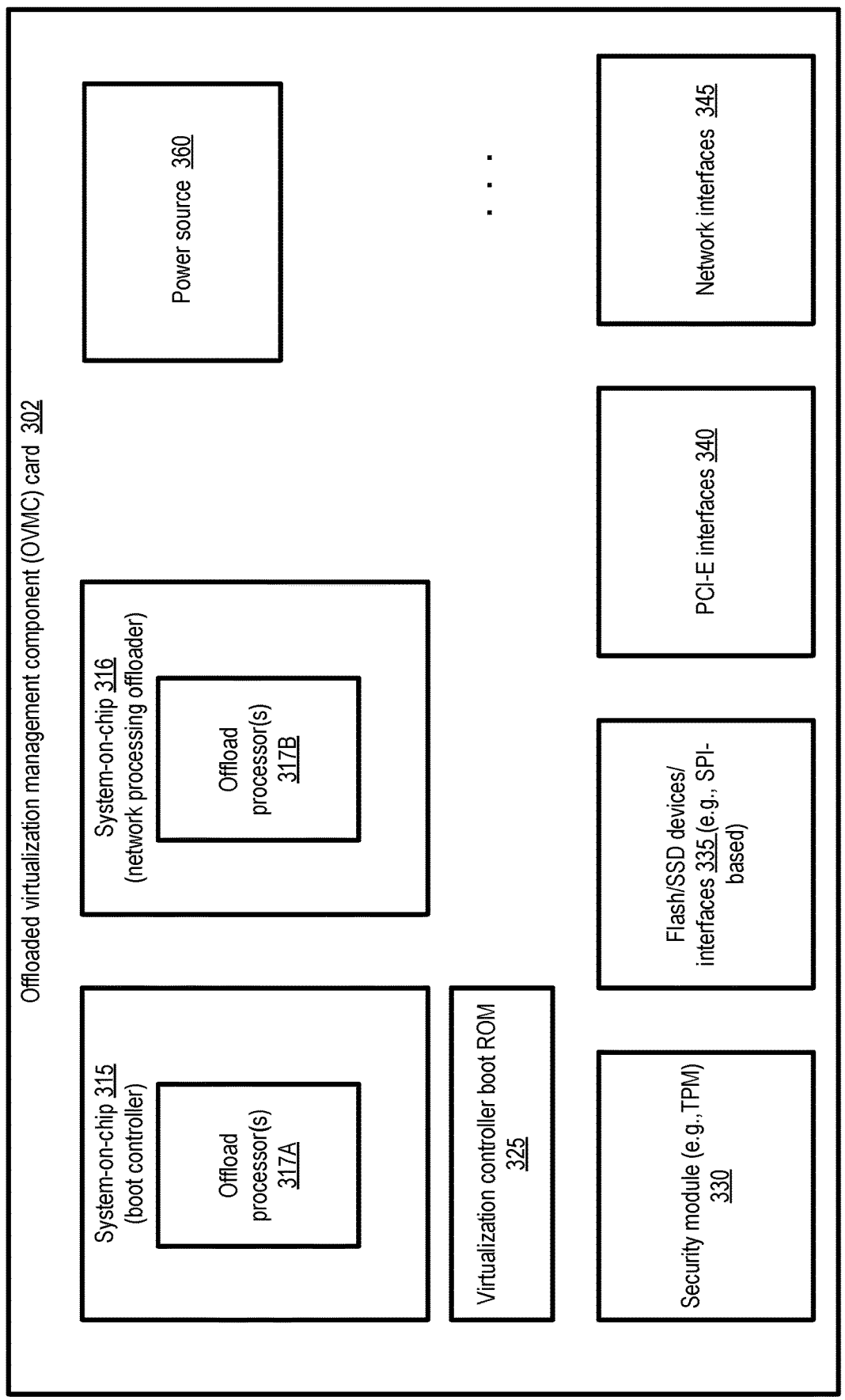
FIG. 3 illustrates example elements of an offloaded virtualization management component card of a virtualization host, according to at least some embodiments.

FIG. 3 illustrates example elements of an offloaded virtualization management component card of a virtualization host, according to at least some embodiments. As mentioned earlier, such a card may be used to perform at least some types of virtualization management tasks and thus free up processing and other resources of a virtualization host (e.g., a host used for VMs at an ERG, or for VMs within a provider network) in various embodiments. As shown, offloaded virtualization management component (OVMC) card 302 (similar in features and capabilities to OVMC 269 of FIG. 2) may comprise a pair of systems-on-chip (SOCs) 315 and 316 with respective sets of offloading processors 317A and 317B (as distinguished from the primary CPUs of the virtualization host at which the OVMC card is attached and used). One of the SOCs (e.g., 315) may be used for a boot controller, while the other may be used primarily or specifically for network processing offloading in the depicted embodiment. Other distributions of virtualization-related responsibilities may be implemented in different embodiments. A secure boot ROM 325 may be used for an initial phase of a multi-phase boot operation of the virtualization host itself by the boot controller in some embodiments. The OVMC card 302 may also include a security module (such as a trusted platform module (TPM)) 330, which may also be used extensively during the boot procedure and/or for post-boot state verification in some embodiments as indicated earlier. In at least some embodiments, a representation of the pre-installed software/firmware of the virtualization host may be included in the security module. In at least some embodiments, only a particular software stack selected by the VCS operator may be installable on the host at which the security module 330 is installed; as such, any attempt to modify the installation may fail, further enhancing the security of the virtualization host.

In addition, the OVMC card 302 may comprise a number of storage, power and connectivity-related components in various embodiments. For example, one or more flash devices/interfaces (or SSDs) 335 may be incorporated within the offload card. These devices may be used, for example, to store firmware and/or software corresponding to various virtualization management components, virtual machine components, and the like. PCI-E interfaces 340 may be used for communicating with processes such as the CPA and the VIPs and/or for communication among the SOCs in various embodiments. In other embodiments, other types of interconnects and corresponding interfaces may be used, such as variants of the QuickPath interconnect (QPI) or the UltraPath interconnect (UPI). Network interfaces 345 may be used for communications between the virtualization host and the control plane of the virtualized computing service in some embodiments, as well as for data-plane communications between the virtual machines launched on the host and one or more network endpoints in at least one embodiment. The OVMC card 302 may also comprise a power source 360 in some embodiments, e.g., sufficient to keep the OVMCs working for at least some targeted number of hours or days in the event of extended power failures. In some implementations, a supercapacitor-based power source may be used.

Separate SOCs on the same card may not be required for the offloaded virtualization manager components in some embodiments. For example, a single SOC capable of performing the boot controller functions as well as network offloading tasks may be utilized in one embodiment. In other embodiments, a separate card may be used for performing network processing tasks than is used for the boot controller. The set of offload card components shown in FIG. 3 is not intended to be comprehensive; several other components, such as timers and the like, may be incorporated at the card in some embodiments. In various implementations, at least some of the components shown in FIG. 6 may not be required.

Example Use of Virtual Network Interfaces at Outbound Command Communicators

Figure 4:
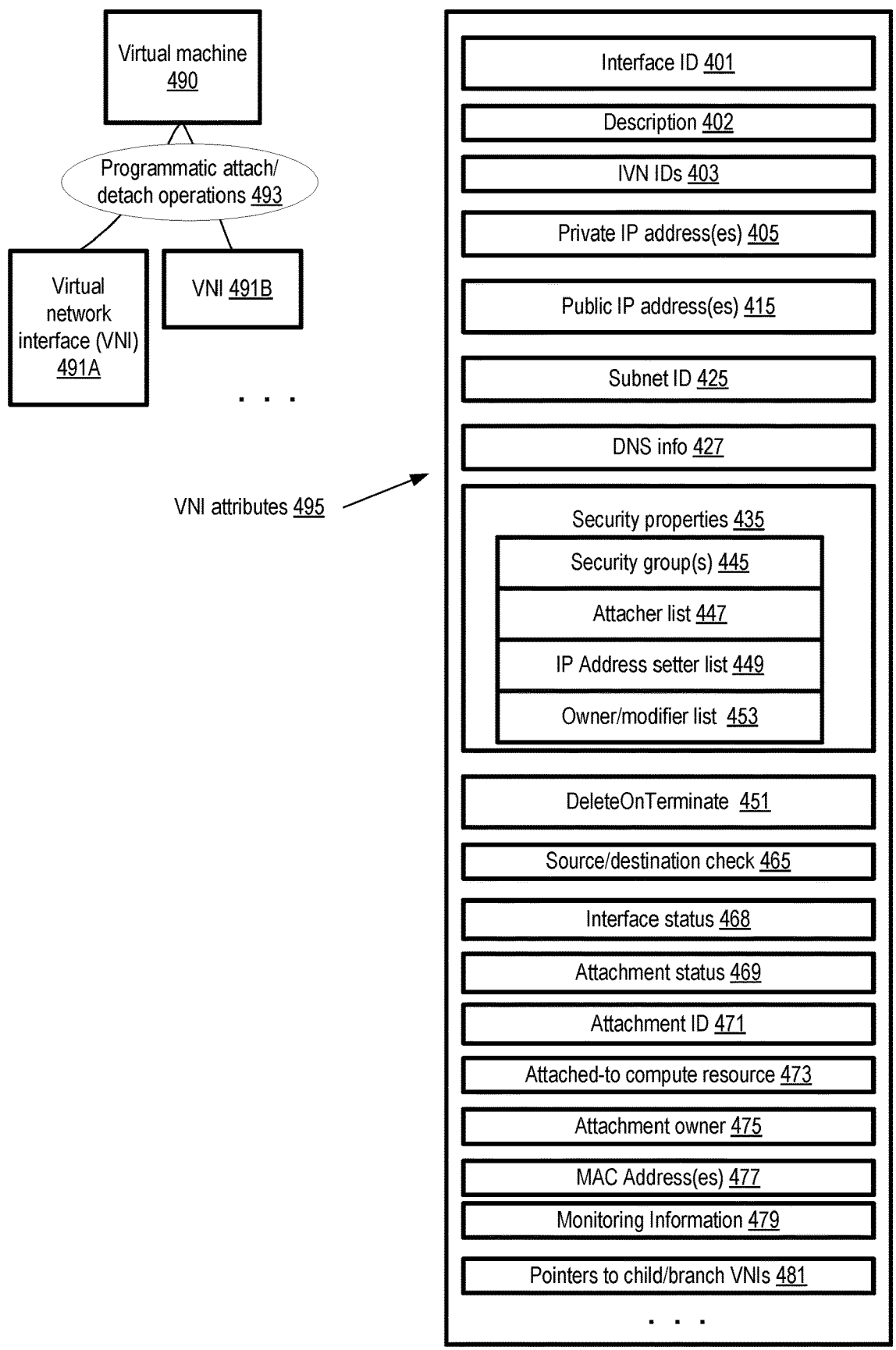
FIG. 4 illustrates example attributes of virtual network interfaces that may be programmatically attached to outbound command communicators associated with extension resource groups in at least some embodiments, according to at least some embodiments.

In various embodiments, virtual network interfaces (VNIs) (which may also be referred to as "elastic network interfaces") may be configured at a VCS (similar to VCS 110 of FIG. 1) and/or at VCS extension resource groups (similar to ERGs 135 of FIG. 1), enabling some networking-related attributes such as IP (Internet Protocol) addresses to be transferred relatively easily between virtual machines without necessarily reconfiguring physical network cards. Such attribute transfers may be accomplished, for example, by detaching a virtual network interface programmatically from one virtual machine (e.g., a virtual machine used as an outbound command communicator (OCC)) and attaching it programmatically to another virtual machine. FIG. 4 illustrates example attributes of virtual network interfaces that may be programmatically attached to outbound command communicators associated with an extension resource group, according to at least some embodiments. As shown, one or more VNIs such as 491A or 491B may be attached to (or detached from) a given virtual machine 490 via programmatic operations 493, independently for example of the specific hardware network interface cards (NICs) of the host at which the virtual machine runs in the depicted embodiment.

A generalized list of example attributes 495 of any given VNI 491 is shown in FIG. 4, not all of which may necessarily be used for all VNIs in at least some embodiments. Only a subset of the attributes or properties shown in FIG. 4 may be implemented in some embodiments, and not all the implemented attribute fields may have to be populated (i.e., some of the attributes may be left blank or null). Respective records comprising fields/entries containing the attributes 495 of various VNIs may be stored in a persistent metadata store in some embodiments, e.g., a store that is accessible from various control-plane or administrative components of the provider network or the VCS.

When a new VNI is created, e.g., in response to a programmatic request, a new interface identifier 401 may be generated for it in the depicted embodiment. In some implementations, a description field 402 may be filled in by the client that requested the creation of the VNI, e.g., "Interface 654 for OCC 485 of ERG E-1142". As discussed earlier, a VCS within which the VNI is to be used may comprise a plurality of isolated virtual networks (IVNs) in some embodiments. The attributes 495 may contain an IVN identifier 403 (indicating an IVN within which the VNI is configured) in such embodiments.

Any of several types of network addressing-related fields may be included within the set of attributes of a VNI in different embodiments. One or more private IP addresses 405 may be specified in some embodiments, for example.

Such private IP addresses, also referred to herein as non-public addresses, may be used internally for routing within a provider network and its extensions such as ERGs, and may not be directly accessible from outside the provider network and its ERGs (or from within other IVNs) in various embodiments. In some embodiments, at least some non-public IP addresses associated with a VNI may not be IP addresses; that is, addressed formatted according to a proprietary protocol of the provider network may be used, or addresses formatted according to a different public-domain protocol may be used. In general, zero or more public IP addresses 415 may also be associated with VNIs in some embodiments; these IP addresses may be visible outside the provider network and its extensions, e.g., to non-VCS severs at the premises where ERGs are set up, various routers of the public Internet and the like. One or more subnet identifiers 425 (e.g., expressed in Classless Inter-Domain Routing or CIDR format) may be included within attributes 495 in some embodiments, such as identifiers of subnets set up by a client within an IVN in which the VNI is to be used. In one embodiment an identification of a Domain Name Server (DNS) responsible for propagating address(es) associated with the VNI, or other DNS-related information 427, may be included in the attributes 495 as well.

In some embodiments the attributes 495 may include security-related properties 435. Some provider networks may allow users to specify rules, including for example firewall-related rules, for the types of incoming and/or outgoing traffic allowed at compute instances to which a VNI may be attached. Such rules may be termed "security groups" and identified via security group(s) fields 445. Various port and protocol restrictions may be enforced using such rules in some embodiments, and multiple rules may be associated with each VNI. For example, a client may use security groups to ensure that only HTTP and HTTPs outgoing or incoming traffic is allowed, to limit the set of TCP or UDP ports to which traffic is permitted, to filter incoming and outgoing traffic according to various policies, and so on. In some embodiments, security groups and/or other security settings of a VNI attached to an OCC of the kind discussed above may be used to prevent the flow of traffic from the OCC to the VCS control plane, while allowing commands issued at the VCS control plane to be transmitted to the OCC. In some implementations an attacher list 447 may be specified, indicating which users or entities are allowed to request attachments of the VNI to computing platforms such as virtual machines of the VCS. In some cases a separate detacher list may be used to specify which entities can detach the VNI, while in other cases a single list such as attacher list 447 may be used to identify authorized attachers and detachers. The collection of users or entities that are allowed to set or modify IP addresses (e.g., public IP addresses 415 and/or private IP addresses 405) of the VNI may be provided in IP address setter list 449, and the set of users or entities that own (or can modify various other fields of) the VNI may be specified in owner/modifier field 453 in some embodiments. For example, an owner/modifier identified in field 453 may be permitted to change the attacher list 447 or the IP address setter list in some implementations, thus changing the set of entities permitted to attach or detach the VNI or modify its IP address(es). While the term "list" has been used for fields 447, 449, and 453, logical data structures other than lists (such as arrays, hash tables, sets and the like) may be used to represent the groups of entities given various security privileges, roles and/or capabilities in various embodiments.

In some embodiments, users of the virtualized computing service of a provider network may be allowed to terminate virtual machines (VMs) programmatically. For example, a client may set up VMs, attach VNIs to the VMs, run a desired set of computations on the VMs, and then issue a request to terminate the instances when the desired computations are complete. In such embodiments, a "DeleteOnTerminate" setting 451 may be used to specify what happens to attached VNIs when a VM is terminated. If DeleteOnTerminate is set to "true" for a VNI attached to the VM being terminated, the VNI may be deleted (e.g., a persistent record comprising attributes 495 for the VNI may be removed from the repository in which it was being stored). If DeleteOnTerminate is set to "false", the VNI may be retained, so that for example it may be attached again to some other VM or other computing platforms. In one embodiment, when a VNI is attached to a VM, an attachment record separate from the VNI attributes 495 may be created to represent that relationship, and the DeleteOnTerminate property may be associated with the attachment record instead of or in addition to being associated with the VNI itself. In such an embodiment, the VNI's attributes 495 may include a reference or pointer to the attachment record or records for each of the attachments in which the VNI is currently involved, and different values of "DeleteOnTerminate" may be set for each attachment record.

In one embodiment, the attributes 495 may contain routing-related information such as an indication 465 of whether a source and/or destination check is to be performed for network packets transmitted to a computing platform to which the VNI is attached. If the source/destination check setting is set to "false" or "off", routing decisions may be made based on a packet's source and destination IP addresses, e.g., the packet may be forwarded from one subnet to another; and if the setting is "true" or "on", the computing platform may not perform routing in some embodiments. Thus the source/destination field 465 may be used in some embodiments to control whether a computing platform to which the VNI is attached performs routing or gateway functions on packets for which it is not the final destination, or whether it ignores such packets. Other types of routing-related information, such as route table entries, may also or instead be included in attributes 495 in other embodiments. Billing-related information may be included in attributes 495 in some implementations, identifying for example the entity or user to be billed for network traffic associated with the VNI.

The interface status field 468 may be used to indicate a current state of the VNI—e.g., whether the VNI is "available", "disabled", or "in-repair". Similarly, the attachment status field 469 may be used to indicate whether the VNI is currently attached, detached or in the process of being attached or detached in some embodiments. In one implementation, as described above, a record of an attachment may be created at the time the corresponding attachment operation is performed, and an identifier or identifiers of the current attachments of the VNI may be stored in attachment id field 471. Identifiers of the virtual machines to which the VNI is currently attached may be stored in attached-to instance field 473, and the user or entity that requested the attachment may be identified via attachment owner field 475 in some embodiments. In one embodiment, a list of identifiers of the physical network interface card (NIC) or NICs currently usable for traffic directed to/from the IP addresses of the VNI may be maintained, e.g., in the form of a MAC address(es) field 477. In some implementations, monitoring information 479, such as statistics about the amount of traffic flowing to or from the IP addresses of the VNI, may also be retained among attributes 495. In at least one embodiment in which VNI multiplexing or parent-child hierarchies are supported, pointers 481 to child or branch VNIs of the VNI may be included. Other fields not shown in FIG. 4 may be included in various embodiments.

In one embodiment, some of the fields shown in FIG. 4 may be replaced by references or pointers to other objects. For example, security information for a VNI may be stored in a separate security object, and the attributes 495 may include a reference to the security object. Similarly, each attachment of a computing platform to a VNI may be represented by an attachment object, and the attributes 495 may include pointers to the appropriate attachment objects in some implementations.

Figure 5:
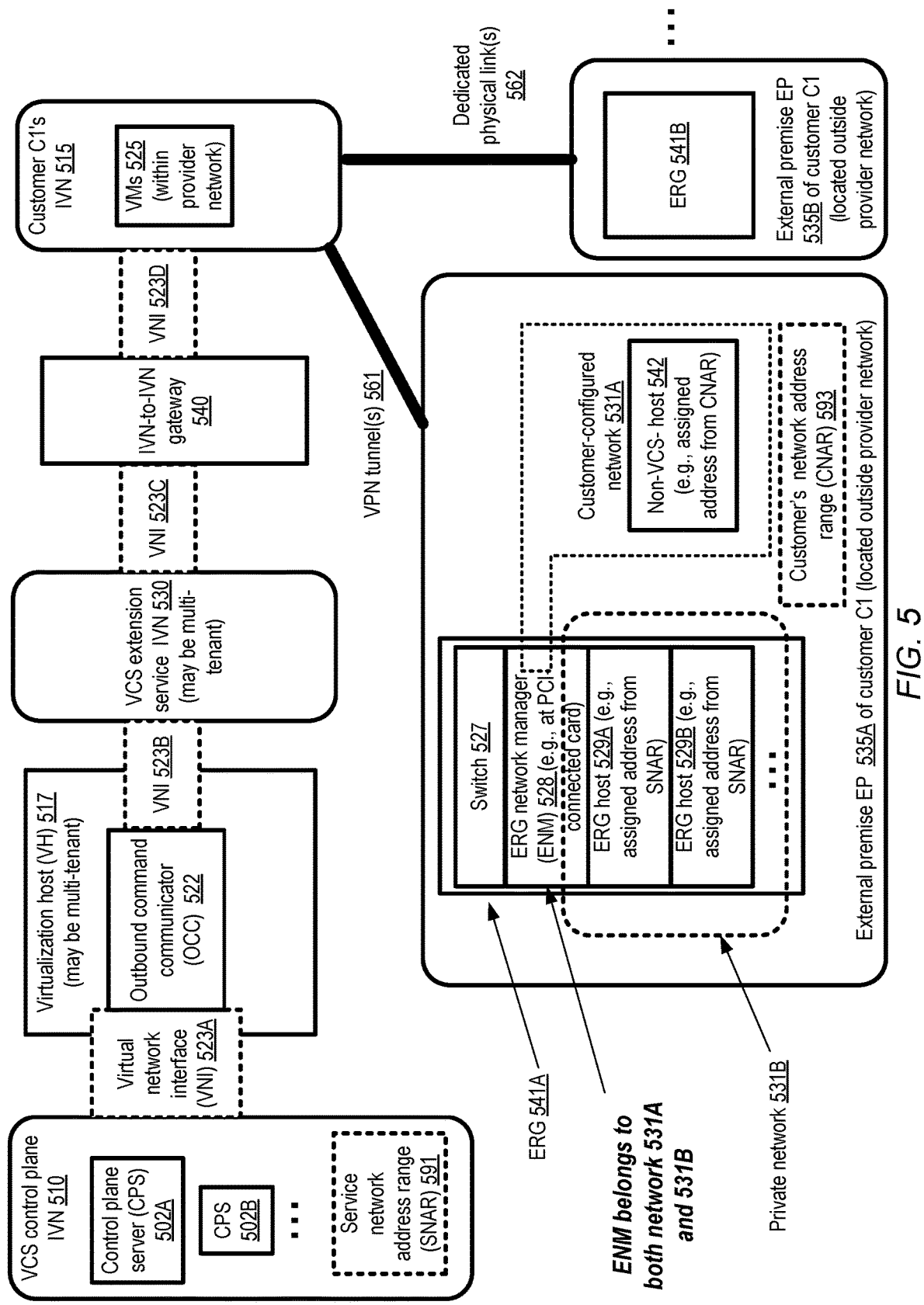
FIG. 5 illustrates an example path which may be used for transmitting commands generated at a control plane of a virtualized computing service to extension resource groups, according to at least some embodiments.

FIG. 5 illustrates an example path which may be used for transmitting commands generated at a control plane of a virtualized computing service to extension resource groups, according to at least some embodiments. A number of isolated virtual networks (IVNs) of the kind introduced above may be traversed along the path in at least some embodiments, including some that are set up on behalf of VCS customers and some that are set up for administrative purposes at the provider network. In the depicted embodiment, in response a client request, a command to launch a compute instance (such as a virtual machine, a bare-metal instance, and/or another type of application execution environment) may be generated at one or more control plane servers 502 (e.g., 502A or 502B) of a virtualized computing service. The control plane servers 502 may be established within a VCS control plane IVN 510 in some embodiments. A service network address range (SNAR) 591 may be used to assign IP addresses to individual hosts of the VCS at which various types of compute instances may be set up in the depicted embodiment. Note that at least in some embodiments, at least some computing devices of the control plane, which run algorithms for administrative tasks like responding to client requests by generating internal commands, resource provisioning, availability management and the like, and are not be used for hosting compute instances, may be assigned addresses that are not part of SNAR 591, and may be configured as part of a separate network than the network at which compute instances are set up within the provider network data centers. From the perspective of the VCS control plane, hosts that happen to be located within extension resource groups (ERGs) may be treated, at least with respect to some types of configuration decisions such as network address assignment, as though the hosts were present in the provider network's data centers in the depicted embodiment. For example, within the VCS control plane, a host at which one or more compute instances are to be set up may be assigned or associated with one or more of the SNAR addresses in various embodiments, regardless of where the host happens to be physically located. In some embodiments, metadata indicating the particular SNAR address associated with individual ones of the hosts to be used for compute instances may be stored at the VCS control plane. Because ERG hosts are located in external premises whose network configurations may not be controlled directly by the VCS control plane, compute instance launch commands (and/or other configuration commands generated at the VCS control plane) may have to be transformed in various ways in different embodiments on their way to the ERG hosts. Such transformations may also ensure that security requirements of the VCS and the clients on whose behalf the ERGs are set up are satisfied in various embodiments. As mentioned earlier, the path over which client requests (e.g., requests to launch instances at ERGs) are received at the VCS control plane (e.g., via public application programming interfaces of the VCS) may differ from the path used to transmit the corresponding commands to the ERGs from the VCS control plane in at least some embodiments.

In some embodiments, an internal service called a VCS extension service may be established to handle some aspects of the management of VCS ERGs, including the secure transmission of administrative commands to ERGs from the VCS control plane. Such an internal service may be referred to as a VCS extension service, and may itself comprise one or more isolated virtual networks (such as IVN 530) in at least some embodiments. An outbound command communicator (OCC) 522 (which may itself be implemented using a virtual machine set up at a host 517 of the VCS extension service in some embodiments), may in effect be configured as part of, or coupled to, at least two networks: the VCS control plane IVN 510 (which may include hosts/servers with addresses from SNAR, that can be used to launch compute instances at the provider network's data centers) and the VCS extension service IVN 530 in the depicted embodiment. In some embodiments, an OCC 522 may be programmatically attached to at least two virtual network interfaces (VNIs, similar in features and functionality to the VNIs described in the context of FIG. 4), such as VNIs 523A and 523B in FIG. 5. One of the VNIs, such as 523A, may be configured to enable the VCS control plane to transmit a command directed towards an ERG, while another VNI, such as 523B, may be used by the OCC to forward at least a version of the command on towards the destination ERG. In at least some embodiments, the configuration settings of VNI 523A may ensure that while commands can be sent from the VCS control plane via the VNI, commands may not be directed to the VCS control plane via the VNI. Such configuration settings may help to ensure that none of the other components of the path shown in FIG. 5 are able to initiate unwanted operations at the VCS control plane in various embodiments. In at least some embodiments, using a VNI such as 523A, the OCC 522 may be assigned (at least) the same network address (part of SNAR) that is assigned to a target ERG host 529 for which the OCC 522 serves as an intermediary for control plane commands. As such, from the perspective of the VCS control plane, sending a message to an OCC may be equivalent (in terms of destination network addressing) to sending the message to the ERG host in such embodiments. When the OCC 522 receives such a message containing a command from the VCS control plane, it may generate a transformed message (which includes or indicates the control plane's command) with the ENM's address as the destination, and send it on the ENM in at least one embodiment. When the ENM eventually receives the transformed version, the ENM in turn may extract the original command and forward it on to the ERG host for which the command was originally generated at the VCS control plane in various embodiments. In various embodiments, a network address assigned to a host 517 at which the OCC 522 executes, different from the network address assigned to the OCC itself, may also be part of SNAR 591 (the address range used at the VCS control plane for hosts at which compute instances may be launched).

In at least some embodiments, an OCC 522 may also perform one or more additional security-related operations with respect to the command received from the VCS control plane. For example, one or more security-related artifacts/objects of the command (such as bearer tokens originally generated at the VCS control plane) may be removed, replaced and/or modified in the message transmitted towards the destination ERG. In one embodiment, for example, the version of the control plane command received at the OCC may contain one or more cryptographically signed tokens, and the outbound version of the command sent towards the destination ERG may include tokens that have been re-signed by the OCC. In some embodiments, for a given administrative command generated at the VCS control plane in response to a client request, different TLS sessions may be established between (a) the VCS control plane and the OCC and (b) the OCC and one or more resources on the path to the destination host. In various embodiments, such types of security-related operations may be performed at the OCC to try to ensure that any security-related data or metadata originating at the VCS control plane does not reach the destination ERG, and therefore to reduce the probability of misuse of such security-related data/metadata.

The VCS extension service IVN 530, and/or the individual virtualization hosts 517, may be used in a multi-tenant manner in some embodiments. For example, several different OCCs 522 used to transmit control plane commands to ERGs of multiple VCS clients may be configured as part of the same extension service IVN 530 in one embodiment. In some embodiments, multiple OCCs for different clients may be established at a given host 517, or a single OCC may be used to transmit commands to ERGs of multiple clients. In some embodiments, a single OCC may be used to transmit commands to multiple ERG hosts, while in other embodiments one OCC may be used per ERG host (note that multiple compute instances may potentially be set up at a given ERG host). In at least some embodiments, an OCC may perform one or more transformations or encapsulation operations on a command issued at the VCS control plane. For example, in one scenario the VCS control plane command may indicate that a host with an IP address A.B.C.D (one of the SNAR addresses) is to be used to launch a compute instance on behalf of a given customer C1 at a particular ERG 541A. The OCC (which may itself have also been assigned the address A.B.C.D in some embodiments as mentioned above) may determine that the command has to be transmitted to an ERG network manager 528 of the ERG 541A before the command is eventually transmitted to and implemented at the host. The OCC may also determine that the ENM 528 is to be accessed using a different IP address K.L.M.N (where K.L.M.N is part of a customer's network address range (CNAR) 593 in use at the external premise 535A at which the target host is located) in such embodiments. The OCC may, in some embodiments, generate a message comprising a transformed/encapsulated version of the command, with the destination address of the message now indicated as K.L.M.N. The message may be transmitted via one or more additional VNIs (such as VNI 523C and 523D) and an intermediary IVN-to-IVN gateway 540 into customer C1's IVN 515 in the depicted embodiment. The IVN-to-IVN gateway 540 may be implemented using a virtual machine or compute instance in some embodiments, at which packet processing software may be run. In at least some embodiments, one or more other manipulations/transformations of the message or command may be performed at the IVN-to-IVN gateway 540, e.g., including an address translation operation required to transmit the message on towards its intended destinations at the ERG 541A.

As shown in FIG. 5, C1's IVN may comprise some number of virtual machines 525 established at hosts within the provider network in at least some embodiments. After the message enters the customer IVN 525, it may be transmitted on to the ENM at the destination ERG 541A, e.g., using one or more VPN tunnels 561 in the depicted embodiment. Note that instead of using a VPN tunnel for secure connectivity between the provider network and an ERG, in some embodiments dedicated physical links (such as dedicated links 562 connecting ERG 541B to the IVN 515) may be used, and/or other types of network links may be used. Dedicated physical links 562 may be referred to as direct connect links in some embodiments. When an ERG 541 is initially set up at the external premise outside the provider network (such as premise 535A or 535B), the ENM of the ERG may initiate the establishment of a VPN tunnel 561 and/or the establishment of connectivity via a dedicated link 562 in at least some embodiments, and information about the particular secure channel to be used for the ERG may be provided to the OCC 522. Note that one or more intermediary devices, not shown in FIG. 5, may be involved in the establishment of a VPN tunnel and/or connectivity via the dedicated physical links—e.g., a VPN gateway may be set up at the customer IVN 515, and/or an edge router or other edge device may act as an intermediary for connectivity via the dedicated physical link.

In at least some embodiments, the devices of an ERG 541 may be set up within one or more racks at the external premise 535. A given rack may, for example, comprise a switch 527, an ENM 528, and a set of hosts 529 (e.g., 529A, 529B, . . . ) at which compute instances may be set up in response to the commands generated at the VCS control plane. In at least some embodiments, an ENM 528 may be configured as part of, or belong to, at least two networks at the external premise. One of the networks may be a private network 531B, comprising at least a subset of the hosts 529 of the ERG in some embodiments. Within this private network 531B, individual hosts may be assigned network addresses (e.g., by the ENM 528 as part of its host initialization operations) from within the VCS service network address range (SNAR) 591. As such, when the ENM 528 receives a command generated at the VCS control plane, which indicates that the command is to be executed at a host with an address A.B.C.D within the SNAR, the ENM may use the private network 531B to direct the command for execution to the intended host in at least some embodiments. The ENM 528 may also be a member of a customer-configured network 531A in the depicted embodiment, which may include zero or more non-VCS hosts 542 of the client. Devices within client-configured network 531A may be assigned addresses from the customer's network address range CNAR 593 in at least some embodiments. Thus, for example, as a constituent of network 531A, the ENM 528 may also be assigned an address K.L.M.N from CNAR 593, and this address may be used to receive VCS control plane commands at the ENM.

In summary, in the embodiment depicted in FIG. 5, a command initially generated at the VCS control plane and transmitted via a path that includes and one or more other intermediaries may eventually be received at the ENM via a network address that is part of the customer-configured network 531A. Along the path, one or more transformation operations may be performed on the original command, e.g., including network address translation, encapsulation, de-encapsulation and the like in various embodiments. The use of several intermediaries, such as the OCC with multiple attached VNIs, the IVN-to-IVN gateway, and the like, each of which may implement respective independent security operations with respect to network traffic, may help to reduce the probability that a rogue entity is able to perform unwanted operations at the VCS and/or at the ERGs in various embodiments. After a message comprising or representing the original the command is received at the ENM, the ENM may extract the original command, and use the private network 531B to transmit the command to the target host in the depicted embodiment. At the target host, the command may be executed (resulting, for example, in the case of a launch command, in the instantiation of one or more compute instances at the target host). From the VCS control plane perspective, as indicated earlier, the hosts 529 may be treated in the same way (at least with respect to some aspects of networking) as hosts located within the provider network are treated in the depicted embodiment. Within a given ERG, for example, network traffic may flow among the hosts 529 analogously to the way in which it flows within hosts located at the provider network in various embodiments—e.g., fast high bandwidth host-to-host network links may be supported. Note that, because the ERG may in effect represent an extension of the customer's IVN 515, the network addresses assigned to compute instances within the ERG may be selected (e.g., by the customer) from a range of addresses in use at the IVN 515 in at least some embodiments (a different range than CNAR or SNAR, for example).

In some embodiments, an ENM 528 may be implemented at least in part using a hardware card attached to a host or server via a peripheral interface, similar to the offloaded virtualization management component (OVMC) 269 shown in FIG. 2. In other embodiments, other approaches may be taken with respect to ENM implementation—e.g., it may be implemented as an operating system process or thread. In at least one embodiment, an ENM 528 may not necessarily be co-located within the same rack as some of the hosts 529—e.g., a separate rack or other physical container may be used for one or more ENMs than is used for some set of ERG hosts. In at least one embodiment, an ENM may perform at least some DHCP (Dynamic Host Configuration Protocol) operations with respect to the hosts of an ERG (e.g., the ENM may act as a DHCP server). In some embodiments, one or more of the operations discussed in the context of FIG. 5 may not necessarily be performed as part of the workflow of transmitting VCS control plane commands to ERG hosts—e.g., a different combination of intermediaries may be used, or a different combination of transformations may be applied to messages or commands.

Example ERG Network Manager

Figure 6:
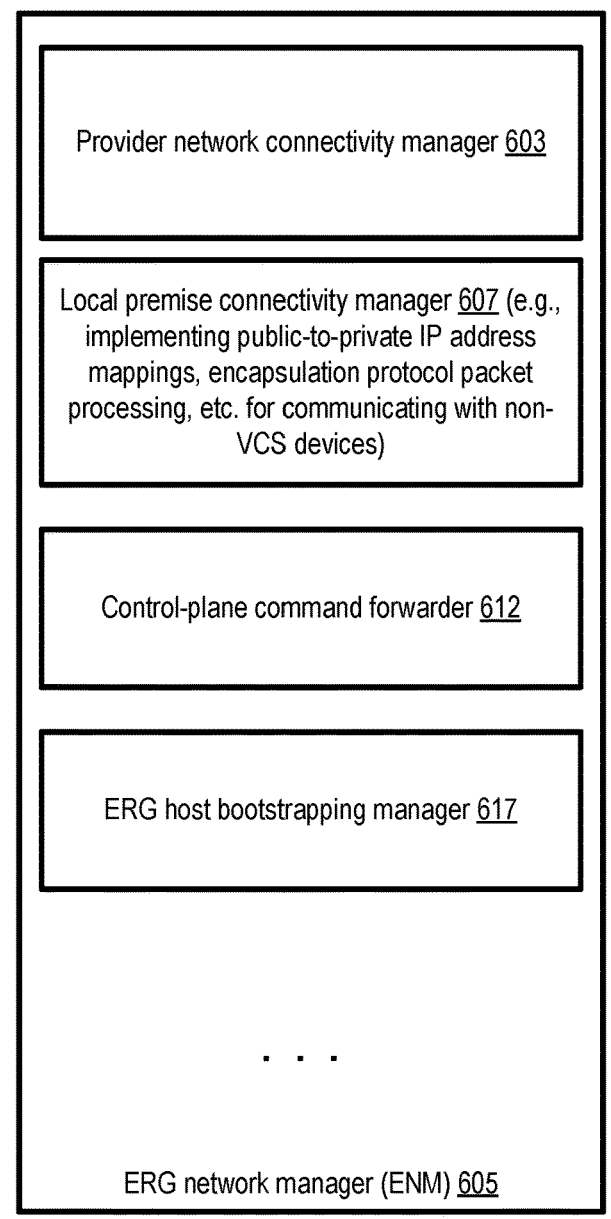
FIG. 6 illustrates example elements of an extension resource group network manager, according to at least some embodiments.

An extension resource group network manager (ENM), implemented using one or more computing devices at an ERG (similar in functionality and features to the ERGs 135 introduced in the context of FIG. 1), may be responsible for several different kinds of operations in various embodiments. FIG. 6 illustrates example elements of an extension resource group network manager, according to at least some embodiments. A provider network connectivity manager 603 of an ENM 605 may initiate establishment of, or participate in the establishment of, one or more secure communication channels to/from resources at provider network data centers in the depicted embodiment. In at least some embodiments, for example, a VPN tunnel may be used for the secure channels.

A local premise connectivity manager 607 of ENM 605 may in effect act as an edge device between the VCS-managed virtual machines of the ERG, and the non-VCS resources present in the location in which the ERG is set up in the depicted embodiment. In at least some embodiments, one or more public IP addresses may be designated for the ERG, enabling resources outside the ERG to communicate with VMs within the ERG. A local premise connectivity manager may for example be responsible for implementing public-to-private IP address mappings as well as private-to-public IP address mappings in at least some embodiments. For example, for packets that are addressed to VMs within the ERG using a public IP address as the destination address, where the destination VM is assigned a private IP address within the ERG, a public-to-private address translation may be performed; similarly, the corresponding private-to-public IP address translations may be performed for packets flowing in the reverse direction. Other encapsulation protocol packet processing for inbound/outbound data plane traffic of the ERG may be performed in different embodiments. In some embodiments, an ENM may perform at least some DHCP functions, e.g., to help set up a private network comprising ERG hosts as discussed below in further detail.

A control plane command forwarder 612 of the ENM 605 may for example be responsible for receiving administrative commands from the VCS control plane (transmitted via the OCC set up for the ERG), analyzing the contents of the command and forwarding the command to an appropriate destination such as a VCS control plane agent at a selected enhanced-security virtualization host (EVH) of the ERG in the depicted embodiment. In some implementations the command forwarder 612 may perform one or more validation/verification operations on the received command and/or apply one or more transformations to the received version of the command before forwarding the command.

An ERG host bootstrapping manager 617 of the ENM 605 may be responsible for bootstrapping/initializing/starting up the EVHs and/or other resources (such as storage servers used for caching virtual machine boot images) of the ERG in the depicted embodiment. Note that at least in some embodiments, not all the elements of an ENM shown in FIG. 6 may be executed at the same computing device: instead, one or more of the elements may be executed at respective computing devices in an embodiment in which a distributed ENM architecture is used. In at least some embodiments, one or more of the ENM elements shown in FIG. 6 may be implemented using a virtual machine instantiated at an EVH. In some embodiments an ENM 605 may comprise a different combination of elements than the elements shown in FIG. 6.

Example Families of Virtual Machines and ERGs

Figure 7:
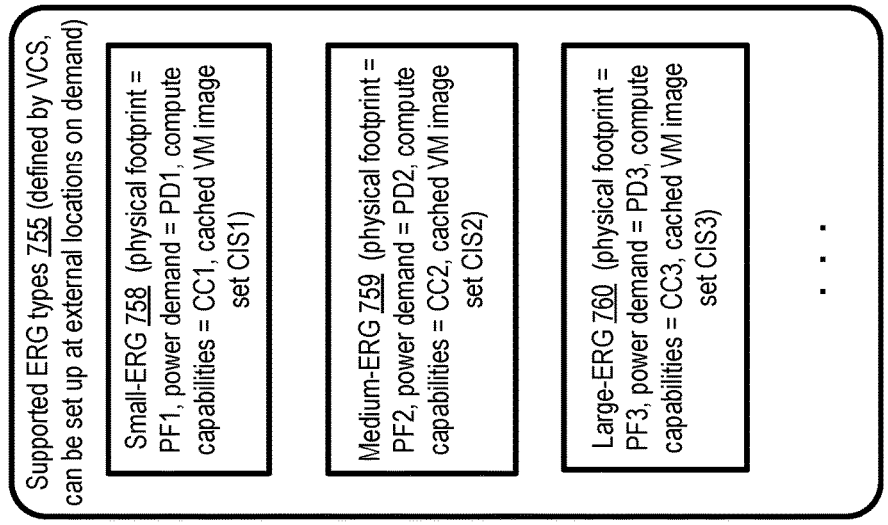
FIG. 7 illustrates example families of virtual machines and extension resource groups that may be supported at a virtualized computing service, according to at least some embodiments.
Figure 7:
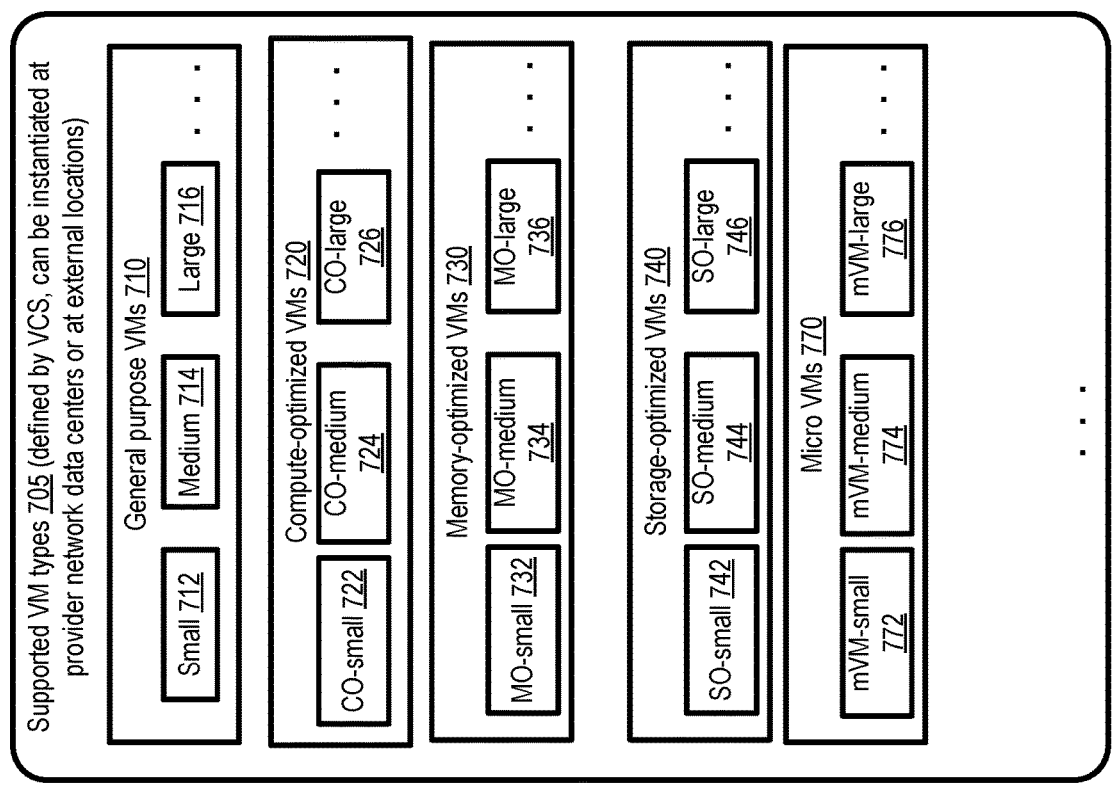

When requesting the establishment of a VM (a VM to be set up either using provider network data center resources, or using ERGs), a VCS client may in some embodiments be able to select from a variety of supported VM types or categories. Similarly, in at least one embodiment, a variety of ERG types with different combinations of features may also be supported, from which a client may select the ERG type that best meets their needs. FIG. 7 illustrates example families of virtual machines and extension resource groups that may be supported at a virtualized computing service, according to at least some embodiments.

A standardized set of supported virtual machine types 705 of a VCS similar to the VCS 110 introduced in the context of FIG. 1 may be subdivided into families, such as a general-purpose VMs family 710, a compute-optimized VMs family 720, a memory-optimized VMs category 730, a storage-optimized VMs family 740, and so on in some embodiments. Depending on the estimated needs of the application for which a given VM is to be used by the client, a VM type from the appropriate family may be selected. The relative resource capabilities for the different VM types may be expressed using units selected or defined by the VCS—e.g., for computing, units such as virtual CPUs that are roughly performance-equivalent to a particular well known processor running at a particular clock speed may be defined. The family may be selected based on qualitative considerations (e.g., is the application mix more memory-intensive or more compute-intensive?), while the particular VM type within the family (e.g., small 712 vs. medium 714 vs. large 716 in the general purpose family) may be selected based on considerations such as desired performance levels, cost, and so on. Compute-optimized VMs 720, such as CO-small VMs 722, CO-medium VMs 724, or CO-large VMs 726 may, for example, be implemented using hosts with more and/or faster processors or cores than the general purpose VMs in the depicted embodiment. In the memory-optimized VMs 730 such as MO-small VMs 732, MO-medium VMs 734, or MO-large VMs 736, the amount of memory (e.g., the number of gigabytes of memory per virtual CPU) relative to the computing capability may be higher than in compute-optimized VMs 720 or the general-purpose VMs. Similarly, in the storage optimized family 740 comprising SO-small VMs 742, SO-medium VMs 744, and SO-large VMs 746, the ratio of local storage to compute power (e.g., number of gigabytes of local solid-state device (SSD) storage per virtual CPU) may be higher than in the other families. In the depicted embodiment, a predefined family 770 of micro VMs (mVMs), each of which may qualify as a micro VM based on its overall resource requirements, may also be supported. An mVM-small category 772, mVM-medium category 774, and/or an mVM-large category 776 may be included in the micro VM family as shown. In at least some embodiments, clients may also be able to define and use their own VM type, e.g., by identifying some combination of processing, storage and memory resources, that does not match one of the pre-defined types. In some embodiments, instances of any of the VM types that can be set up at the provider network data centers may also be set up at ERGs; in other embodiments, respective different sets of VM types may be supported at ERGs and provider network data centers. In at least some embodiments, as mentioned earlier, bare-metal instances may be set up at hosts of the VCS or its ERGs, e.g., in addition to the types of VMs indicated in FIG. 7.

In some embodiments, a number of ERG categories 755 may be defined by the VCS operator, enabling a client to choose the particular combination of features of an ERG set up on their behalf at locations external to the provider network. The ERG types (Small-ERG 758, Medium-ERG 759 and Large-ERG 760) may differ from one another along any of several dimensions in the depicted embodiment. For example, the physical footprint (floor space PF1, PF2 or PF3 required for the racks containing the collection of ERG devices) may differ from one ERG type to another, the electrical power demand (PD1, PD2 or PD3) may differ, the total compute capabilities (CC1, CC2, CC3) may differ, and/or the set of cached VM images CIS1, CIS2 or CIS3 may differ among the different ERG types in some embodiments. In at least one embodiment, when requesting an ERG, a client may provide specifications (in terms of physical footprint, power demand, compute capabilities, cached VM images etc.) that do not necessarily match the specific ERG types supported by the VCS. In one such scenario, the VCS operator may either accept the ERG specifications and deliver the corresponding equipment, or provide an indication of the closest matching supported ERG configuration to the client (which may then be ordered by the client if desired). In one embodiment, only a single type of ERG may be supported by the VCS operator.

Example Programmatic Interactions

Figure 8:
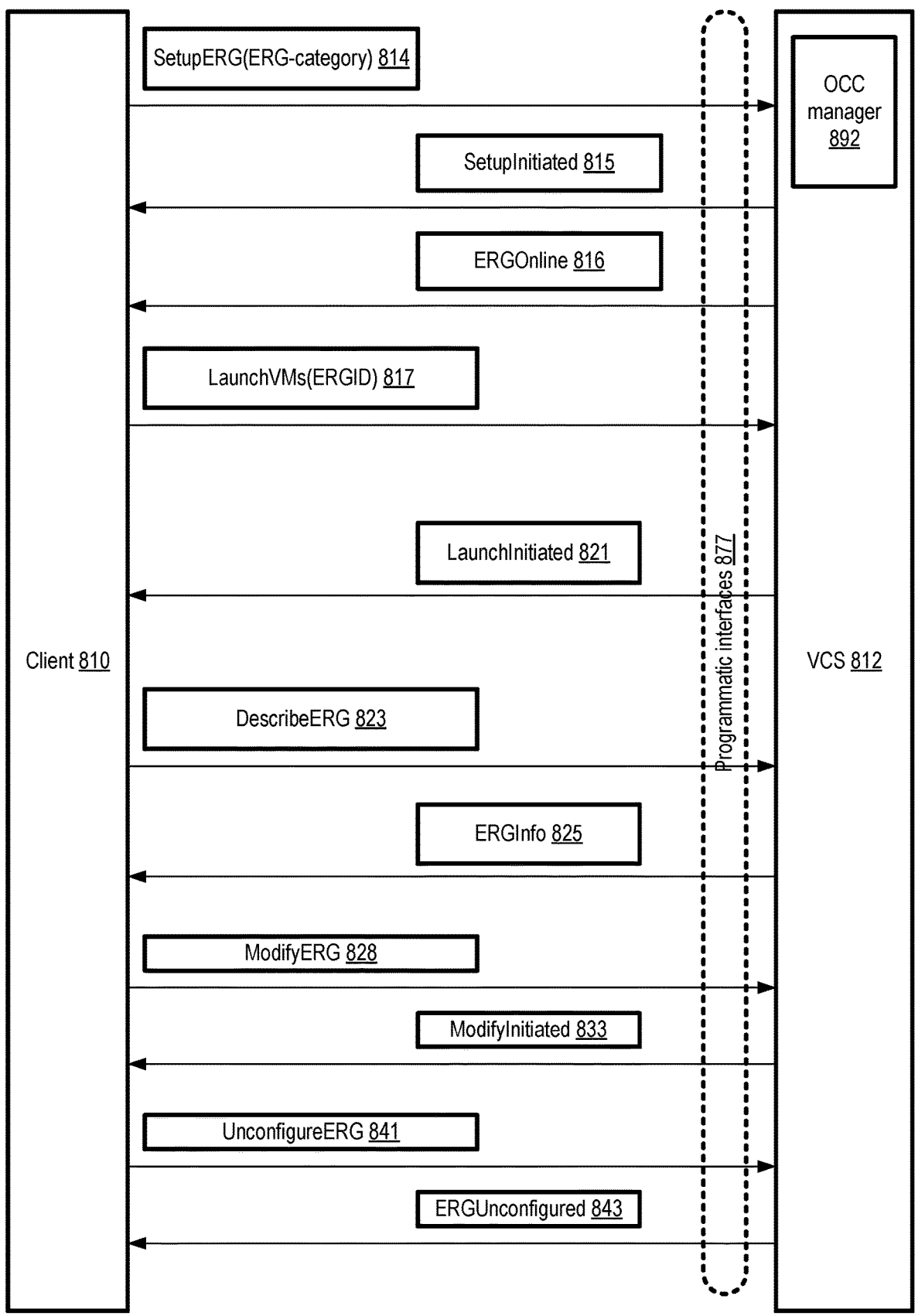
FIG. 8 illustrates example programmatic interactions pertaining to extension resource groups of a virtualized computing service, according to at least some embodiments.

In various embodiments, a number of programmatic interfaces may be used by VCS clients to submit requests associated with setting up and using ERGs similar to ERGs 135 introduced in the context of FIG. 1. FIG. 8 illustrates example programmatic interactions pertaining to extension resource groups of a virtualized computing service, according to at least some embodiments. A VCS 812 may implement one or more programmatic interfaces 877 in the depicted embodiment, such as for example a set of application programming interfaces (APIs), web-based consoles, graphical user interfaces, command line tools and the like, any combination of which may be used by VCS clients 810 to interact with the VCS.

A client 810 may, for example, submit a SetupERG request 814 via a programmatic interface 877, requesting that an extension resource group be configured at a specified location external to the data centers of the VCS itself. In embodiments in which multiple categories of ERGs are supported (similar to the ERG types 755 discussed in the context of FIG. 7), the particular type of ERG to be set up may be indicated via a parameter of the request 814 (such as an ERG-category parameter shown). Other parameters may indicate, for example, the location at which the ERG is to be established, constraints such as time periods during which the collection of ERG devices/equipment should be delivered, and so on. In response to the SetupERG request 814, a workflow comprising various preliminary tasks to be performed at the provider network may be initiated in some embodiments, and a response message such as SetupInitiated 815 may be transmitted to the client. In at least one embodiment, an outbound command communicator (OCC) instance (such as a virtual machine within a VCS extension service of the kind discussed above) may be instantiated or designated for the requested ERG as part of the preliminary task workflow. Such an OCC may in effect proactively wait to be contacted by an ERG network manager in some embodiments. The ERG network manager may of course not be able to attempt to communicate with the OCC until the ERG equipment is delivered to the targeted external location, powered on, connected to the Internet and so on in at least some embodiments, which may only occur some amount of time after the SetupERG request is processed at the VCS 812. In some embodiments, an OCC manager 892 of the VCS may be responsible for instantiating OCC instances and/or determining which particular OCC instance is to be used for a given ERG. In at least one embodiment, a given OCC instance may be used for several different ERGs of one or more VCS clients, e.g., in a multi-tenant mode of operation.

In the depicted embodiment, the VCS 812 may transmit an ERGOnline message 816 to the client 810 after the ERG has been delivered and initialized at the desired location, indicating that the client may begin using the ERG. In some embodiments, an implicit communication may be used to inform the client that the requested ERG is ready to use, rather than an explicit message—e.g., an entry for the requested ERG within a console may show via a visual icon that the ERG has become available for use. In at least some embodiments, one or more pre-requisite conditions may have to be met before the equivalent of an ERGOnline message is transmitted to a client: e.g., a secure communication channel that can be used by the OCC instance to transmit administrative commands to the ERG may have to be established, at least some minimal number of virtualization hosts may have to be successfully booted, and so on.

A VCS client 810 may use programmatic interfaces 877 to submit a request 817 to launch one or more virtual machines as a specified ERG (indicated for example by a parameter ERGID) in the depicted embodiment. The request 817 may be transmitted to the VCS control plane by a pathway different from the one-way pathway used to transmit the corresponding command(s) to the ERG in at least some embodiments. After the command to launch the VM(s) has been transmitted to the ERG from the OCC, a message 821 indicating that the launch has been initiated may be transmitted back to the client in some embodiments. Note that at least in some embodiments the LaunchInitiated message 821 may simply indicate that commands to launch the VM(s) have been sent to the ERG; the VCS agent processes that actually perform the work to launch the VMs at the EVHs of the ERG may not necessarily transmit outbound administrative messages confirming whether the launch has succeeded or not in such embodiments.

A DescribeERG request 823 may be submitted in some embodiments by a client 810 to obtain information about the contents and/or status of an ERG, and the requested information may be provided in the form of an ERGInfo message 825. The information may in some embodiments include, for example, a list of entities authorized to use the ERG (e.g., to launch or terminate VMs at the ERG), the set of EVHs and/or VMs of the ERG, the set of VM images caches at the ERG (if any), the date at which the ERG was set up, ERG billing-related data, etc.

In at least some embodiments, a client 810 may request a modification of an ERG, e.g., by submitting a modifyERG request 828 that indicates the desired changes. Such changes may, for example, include a request to increase or decrease the number of EVHs of the ERG, to modify the set of users/groups/entities permitted to use the ERGs, and so on. If the modifications requested can be accommodated based on the applicable rules and policies of the VCS, a corresponding workflow to implement the changes may be initiated in the depicted embodiment, and a ModifyInitiated message 833 indicating the change workflow is underway may be transmitted to the client. In one embodiment, a client 810 may submit an UnconfigureERG request 841 to indicate that an ERG is no longer required. In response, the VCS may initiate a workflow to terminate accessibility to the ERG, shut down, dismantle and transport away the equipment set up for the ERG, and an ERGUnconfigured message 843 may be sent in some embodiments to the client to indicate that the workflow has been initiated and the ERG is no longer accessible for programmatic requests. In at least some embodiments, a different set of programmatic interactions may be supported for ERG-related operations than is shown in FIG. 8.

Example VM Launch Workflow

Figure 9:
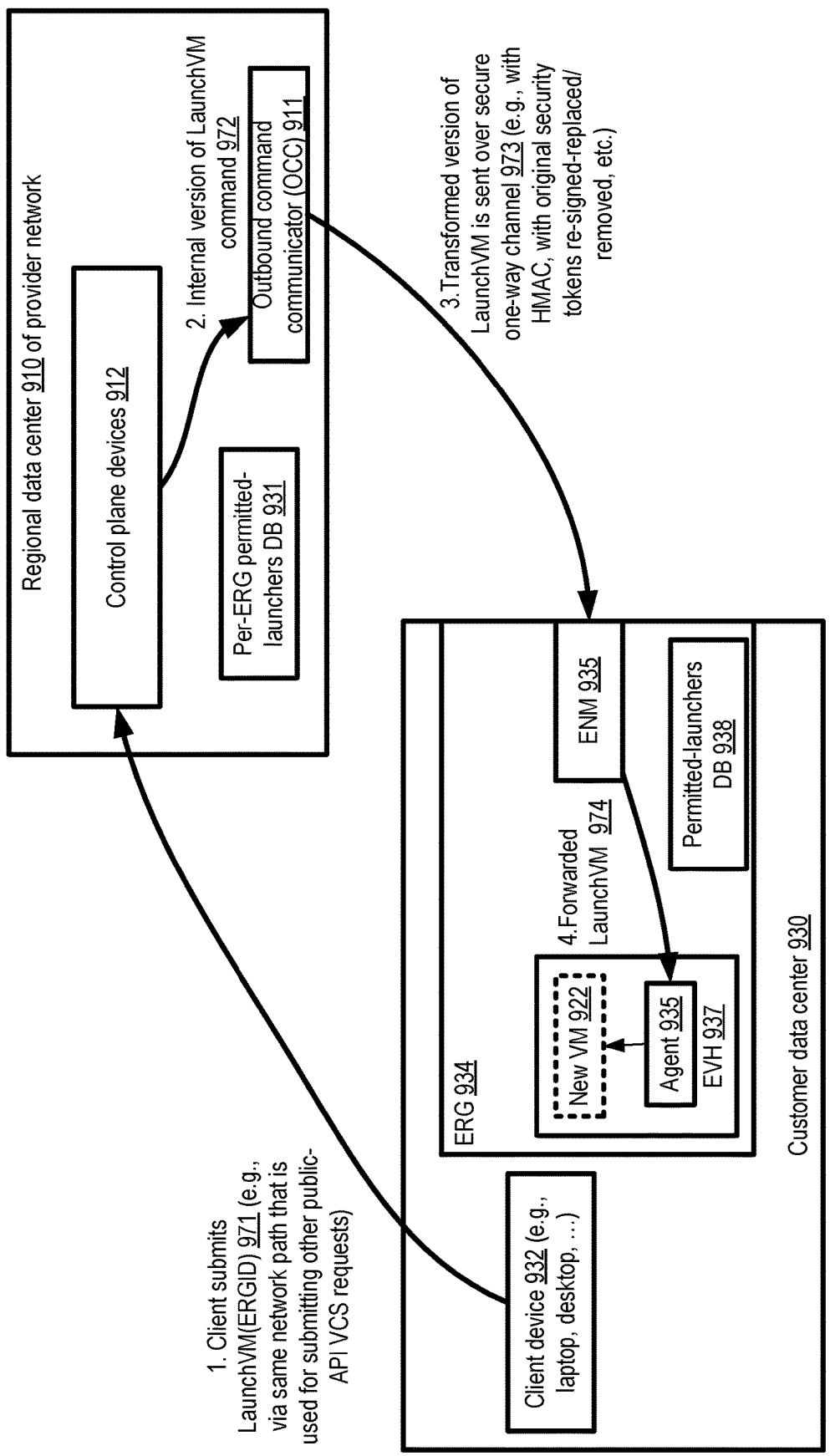
FIG. 9 illustrates an example workflow associated with launching a virtual machine at an extension resource group, according to at least some embodiments.

FIG. 9 illustrates an example workflow associated with launching a virtual machine at an extension resource group, according to at least some embodiments. In the example scenario shown in FIG. 9, an ERG 934 has been set up at a customer data center 930 at the request of a VCS client. The client may use a device 932 (e.g., a laptop, desktop or the like), which may happen to be located in the data center 930, to submit a request to launch a virtual machine (a LaunchVM(ERGID) request 971), indicating that the VM is to be launched at ERG 934, as indicated in step 1 of the workflow. The network path over which the LaunchVM request is submitted may be the same path as that used for any other VCS request that the client submits via a public API of the VCS; as such, this path may not comprise the one-way secure channel set up specifically for transmitting VCS control plane commands to the ERG by the OCC 911. In at least one embodiment, the VCS may be implemented using a plurality of regional data centers of a provider network, such as regional data center 910. Individual ones of the regional data centers may for example be set up in various metropolitan areas, states or countries in which the provider network provides services. In some embodiments, when a particular VCS client submits a programmatic request, it may be routed to a particular regional data center, based for example on the source IP address from which the request is submitted, or based on a "home" region with which the client's account is associated by default.

In the embodiment depicted in FIG. 9, control plane devices 912 within the regional data center 910 may obtain the LaunchVM request 971, process the request contents and transmit an internal version of a LaunchVM command 972 to an OCC 911 associated with the ERG at which the VM is to be instantiated (as indicated in step 2 of the workflow). In at least some embodiments, a database 931 indicating users/groups/entities permitted to launch virtual machines at individual ERGs may be maintained at the VCS, and part of the processing of the LaunchVM request at the control plane devices 912 may comprise using the database 731 to verify that the requester is allowed to launch a VM of the specified type at the specified ERG. In one embodiment, the OCC 911 may participate in the processing/verification of the request submitted by the client and/or the internal version of the LaunchVM command.

After processing and/or verification operations regarding the VM launch have been successfully completed, as part of step 3 of the workflow, a transformed version of the command may be sent from the OCC 911 over a secure one-way channel 973 to the ERG network manager (ENM) 935 of ERG 934 in the depicted embodiment. As part of the operations performed at the OCC, in some embodiments, one or more security tokens may be removed or replaced in the command, a message authentication code such as HMAC may be created for the command, an entry for the command may be stored at a log by the OCC 911, and so on.

The ENM 935 may forward the received command to a VCS control plane agent 935 at a particular EVH 937 selected for the requested virtual machine in the depicted embodiment (step 4 of the workflow). In some embodiments, the ENM and/or the agent 935 may re-verify that the requester of the VM is among the permitted launchers indicated in a database 938 local to the ERG. In at least one embodiment, the ENM and/or the agent may also store a log entry indicating the command received from the OCC. The decision as to which particular EVH 937 is to be used may be made using any of several approaches in different embodiments. In one embodiment, the client may be able to indicate, e.g., in the original LaunchVM request, a particular EVH to be used for a VM at a specified ERG. In other embodiments, one or more placement managers running at the VCS control plane devices 912 may select the particular EVH 937 on which a requested VM should be launched. In some embodiments, the OCC 911 and/or the ENM 935 may be responsible for selecting a particular EVH for a requested VM. After the LaunchVM command is transmitted to the VCS control plane agent 935 at the EVH 937, a new VM 922 of the requested type may be instantiated in the depicted embodiment, e.g., using a technique similar to that discussed earlier in the context of FIG. 2. In various embodiments, a similar message pattern to that shown in FIG. 9 may be used for other types of requests and corresponding commands—e.g., a client may submit a request to terminate a VM at an ERG using a different pathway than is used for the corresponding VCS control plane-issued terminate commands directed to the ERG. In some embodiments, a different workflow than that shown in FIG. 9 may be used to launch virtual machines at ERGs, and/or different pathways may be used for the messages involved in fulfilling other types of client-submitted requests.

Example Use of Additional Provider Network Services at ERGs

Figure 10:
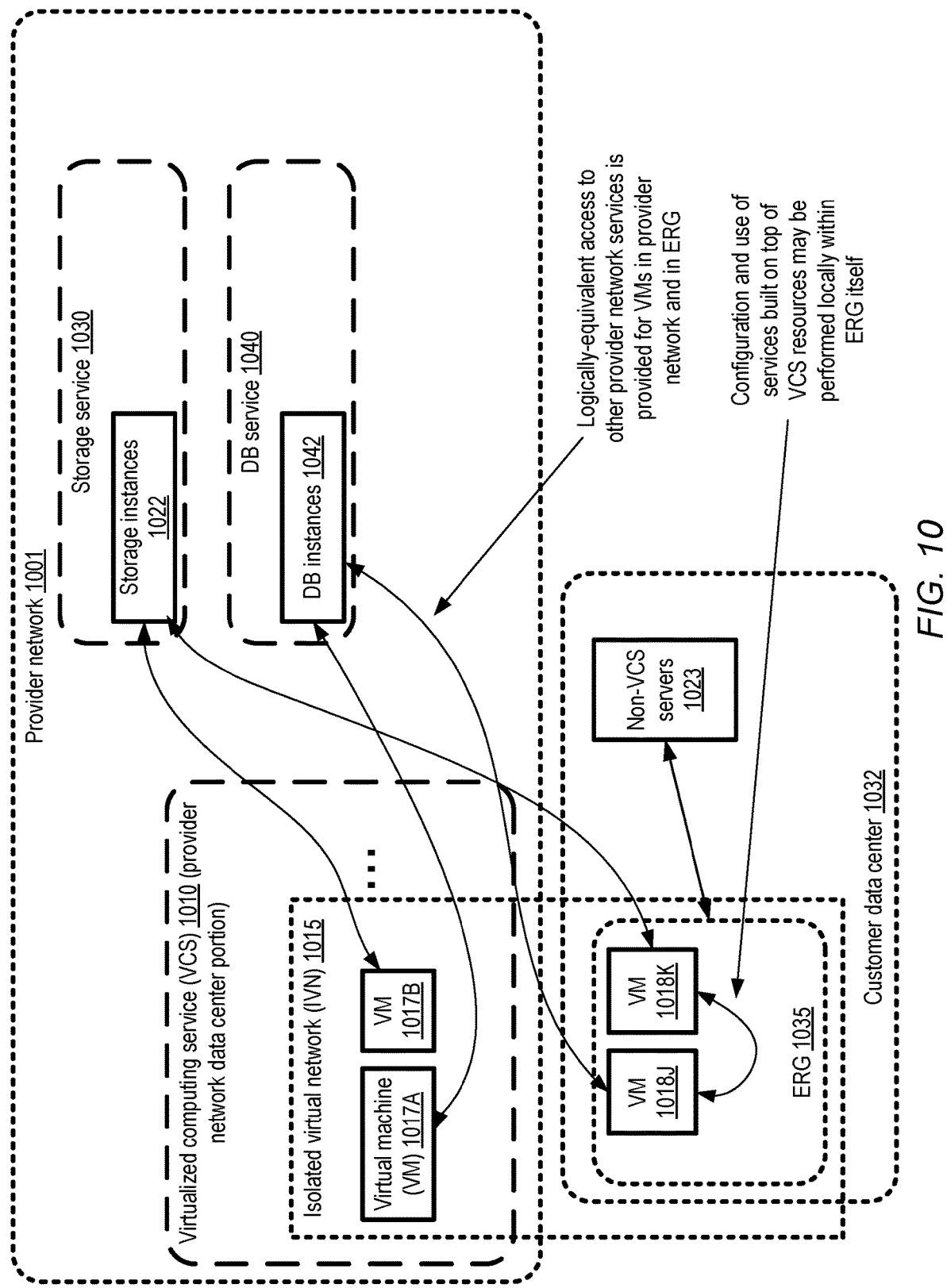
FIG. 10 illustrates an example of the use of additional provider network services at an extension resource group of a virtualized computing service, according to at least some embodiments.

In some embodiments, a provider network at which a virtualized computing service is implemented may also provide access to other higher-level network-accessible services that utilize VCS virtual machines as building blocks—for example, an instance of a database may be implemented using a virtual machine, and offered for use by clients of a network-accessible database service. In various embodiments, such higher-level services may also be made available at ERGs, e.g., using the local VMs set up within the ERGs to implement the features of the services. In addition, other services of the provider network, which do not rely on VCS virtual machines directly, may also be accessed from the VMs set up at ERGs in some embodiments, in a manner analogous to the way that such services are accessible from VMs set up within provider network data centers. FIG. 10 illustrates an example of the use of additional provider network services at an extension resource group of a virtualized computing service, according to at least some embodiments.

In the depicted embodiment, provider network 1001 comprises at least a virtualized computing service (VCS) (similar in functionality and features to VCS 110 of FIG. 1), a storage service 1030, and a database service 1042. A portion 1010 of the VCS may be implemented using resources located at provider network data centers, and extensions of the VCS may be set up at locations external to the provider network, such as an ERG 1035 located within a customer data center 1032 which also includes one or more non-VCS servers 1023.

In the example scenario depicted in FIG. 10, an isolated virtual network (IVN) 1015 of the kind discussed earlier has been established for a VCS client. IVN 1015 comprises a plurality of virtual machines (such as VMs 1017A and 1017B) within provider network data center portion 1010 of the VCS, as well as a plurality of virtual machines (such as 1018) and 1018K) in the ERG 1035 located at customer data center 1032. Programs running at any of the VMs may utilize resources of other provider network services in the depicted embodiment. For example, storage instances 1022 of storage service 1030 may be accessed from VM 1017B in the provider network, as well as from VM 1018K in the ERG 1035; similarly, database instances 1042 of database service 1040 may be accesses from VM 1017A within the provider network as well as from VM 1018J in the ERG. In the depicted embodiment, the VMs in the ERG 1035 may be provided access to other provider network services, logically equivalent to the access provided to VMs instantiated within the provider network. Within the ERG 1035 itself, the configuration and use of services that are built on top of VCS virtual machines (i.e., services that use VMs as building blocks) may be performed locally in the depicted embodiment, without having to access resources outside the ERG. For example, in one embodiment in which a database instance of a DB service 1040 comprises a virtual machine of the VCS, a new database instance may be created locally within the ERG using an ERG VM 1018J in response to a request for a DB instance from another ERG VM 1018K. To the VCS customer on whose behalf ERG 1035 is set up in the depicted embodiment, ERG-based virtual machines such as 1018) and 1018K may thus appear to be functionally equivalent to VMs such as 1017A and 1017B that are instantiated within the provider network, even though the control plane components of the VCS are implemented within the provider network data centers and are not replicated at the ERG. In at least some embodiments, in the unlikely event that connectivity between the ERG and the provider network data centers is disrupted, the VMs that have already been instantiated at the ERG, as well as resource instances of other services (such as the database service mentioned above) that have been set up at the ERG may continue to work for at least some period of time; as such, continuous connectivity to the provider network data centers may not be required for a client to use the ERG.

Methods for Provider Network Service Extensions

Figure 11:
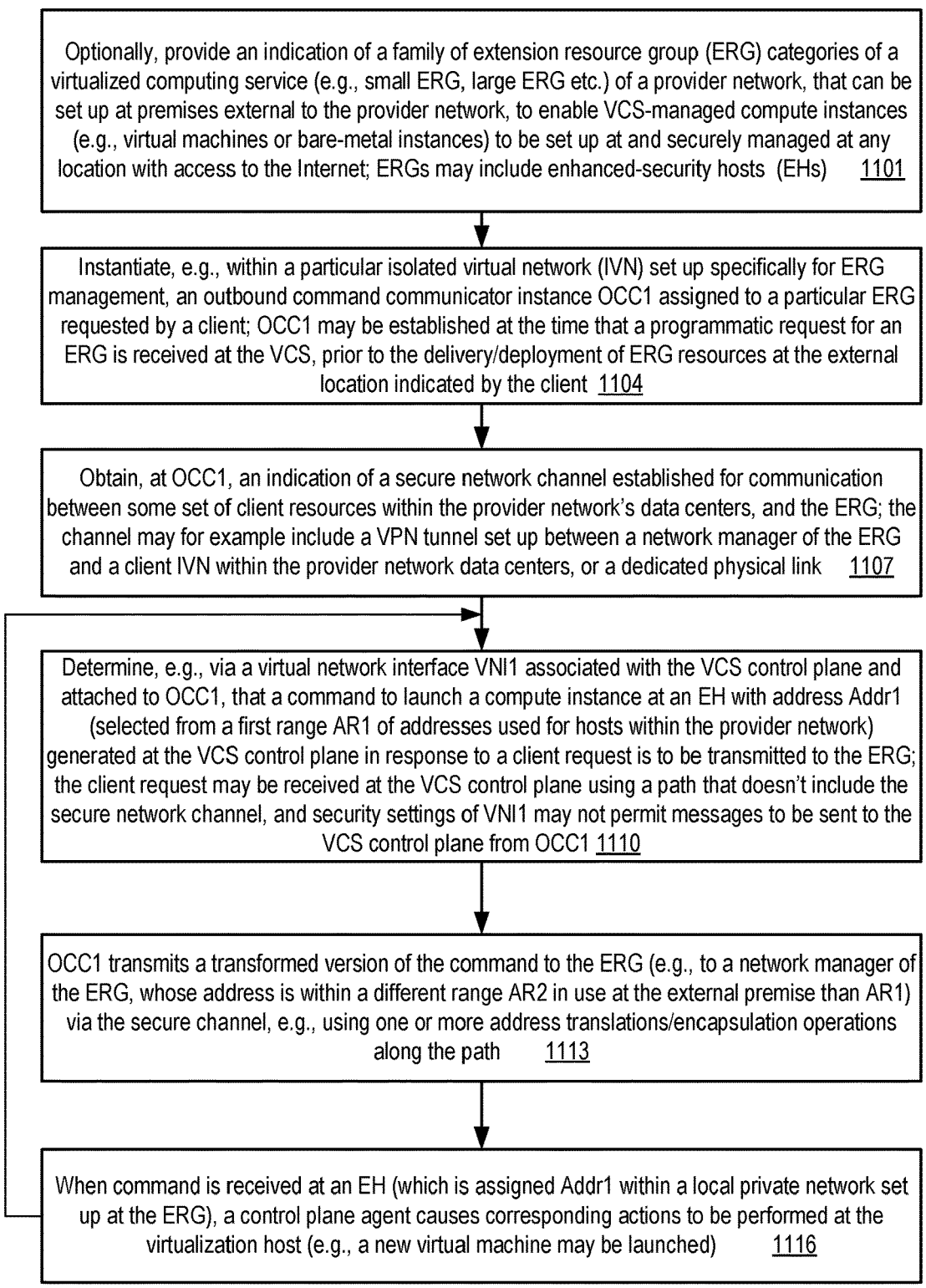
FIG. 11 is a flow diagram illustrating aspects of operations that may be performed at a provider network to establish extension resource groups and enable virtual machines to be set up at the extension resource groups, according to at least some embodiments.

FIG. 11 is a flow diagram illustrating aspects of operations that may be performed at a provider network to establish extension resource groups and enable virtual machines to be set up at the extension resource groups, according to at least some embodiments. As shown, in element 1101, an indication of a family of extension resource group (ERG) categories of a virtualized computing service (e.g., "small" ERG, "large" ERG etc.) of a provider network, that can be set up at premises external to the provider network may optionally be provided, e.g., via programmatic interfaces of the VCS. The ERGs may, for example, enable VCS-managed compute instances (including virtual machines and bare-metal instances etc.) to be set up at and securely managed at any location with access to the Internet (such as customer data centers, co-location facilities, remote field locations of organizations such as telecommunications companies, energy companies and the like) on behalf of VCS customers. A given ERG may include, for example, a respective set of pre-configured hardened resources such as one or more enhanced-security virtualization hosts (EHs) in at least some embodiments.

In at least one embodiment, outbound command communicator (OCC) instances for securely transmitting VCS control plane commands from the provider network data centers to ERGs may be set up. For example, in one embodiment, within a particular isolated virtual network (IVN) set up specifically for ERG management at one or more provider network data centers, an outbound command communicator instance OCC1 assigned to a particular ERG requested by a client may be established (element 1104). A VCS compute instance may be used to implement at least a portion of OCC's functionality in some embodiments. OCC1 may be established at the time that a programmatic request for an ERG is received at the VCS in one embodiment, e.g., prior to the delivery/deployment of ERG resources at the external location indicated by the client.

At OCC1, an indication of a secure network channel established for communication between (a) some set of client resources within the provider network's data centers and (b) the ERG may be obtained (element 1107) in the depicted embodiment. The channel may for example include a VPN tunnel set up between a network manager of the ERG and a client IVN within the provider network data centers, and/or a connection established over a dedicated physical link designated for a client's traffic. After the secure channel is established, programmatic requests (e.g., requests to launch compute instances at the ERG) pertaining to ERG operations may be submitted to VCS control plane devices (e.g., to API handlers running at servers within the provider network data centers) by the client on whose behalf the ERG is set up in various embodiments.

According to various embodiments, a determination may be made at OCC1 that a virtual machine launch command (or other administrative command) generated at the VCS control plane in response to a client request is to be transmitted to the ERG (element 1110). An address Addr1 of the EH at which the command is to be executed may be part of a range of addresses used by the VCS control plane for at least some hosts located within the provider network's data centers. In one example scenario, OCC1 may have one or more virtual network interfaces associated with it, and an indication of such a command may be obtained at OCC1 via a particular virtual network interface VNI1 associated with the VCS control plane and attached to OCC1. OCC1 itself may be assigned the target host EH's address in at least some embodiments as discussed earlier (e.g., by setting an address of VNI1). Note that the client request that led to the generation of the VCS control plane command may be received at the VCS control plane using a path that doesn't include the secure network channel set up between OCC1 and the ERG in at least some embodiments. In at least one embodiment, security settings of VNI1 may not permit messages to be sent to the VCS control plane from OCC1.

OCC1 may transmit, using the secure channel, a transformed version of the command (e.g., with some security artifacts stripped/replaced/re-signed to reduce the probability of misuse of the security artifacts at the ERG) to the ERG in the depicted embodiment (element 1113). In one embodiment, the transformed version of the command may be transmitted initially to a network manager (ENM) of the ERG, e.g., via a path that includes one or more additional intermediaries similar to those discussed in the context of FIG. 5. The address used to deliver the message containing the command to the ENM may be part of an address range of a first network set up at the external premise in some embodiments, e.g., an address range selected by the client independently of the addresses being used within the VCS control plane. The command may be forwarded by the ENM to an EH. In some embodiments, one or more address translations may be performed along the path traversed by the message(s) used to convey the command to the ERG. In some embodiments, VCS control plane commands need not necessarily be transformed before being transmitted to an ENM or some other resource within the ERG.

At the ERG, in some embodiments, the transformed version of the command may be obtained at a VCS control plane agent instantiated within an EH. In at least one embodiment, the EH may be assigned the address Addr1 within a second network set up at the external premise. In some embodiments, the ENM may be part of both networks at the external premise—the one configured by the client, and the second network in which addresses from a range in use at the VCS control plane are assigned to hosts. The agent at the EH may cause the requested actions to be performed at the EVH (element 1116), e.g., a new compute instance may be launched, an existing compute instance may be terminated, and so on. A similar workflow may be executed with respect to additional requests submitted by a client in the depicted embodiment—e.g., operations corresponding to elements 1110-1113 may be repeated for various client requests as long as the ERG remains operational. The client may also submit various requests pertaining to the configuration of the ERG itself to the VCS control plane in various embodiments—e.g., to view, modify or terminate an ERG, as discussed in the context of FIG. 8—and the VCS may perform the requested operations.

Figure 12:
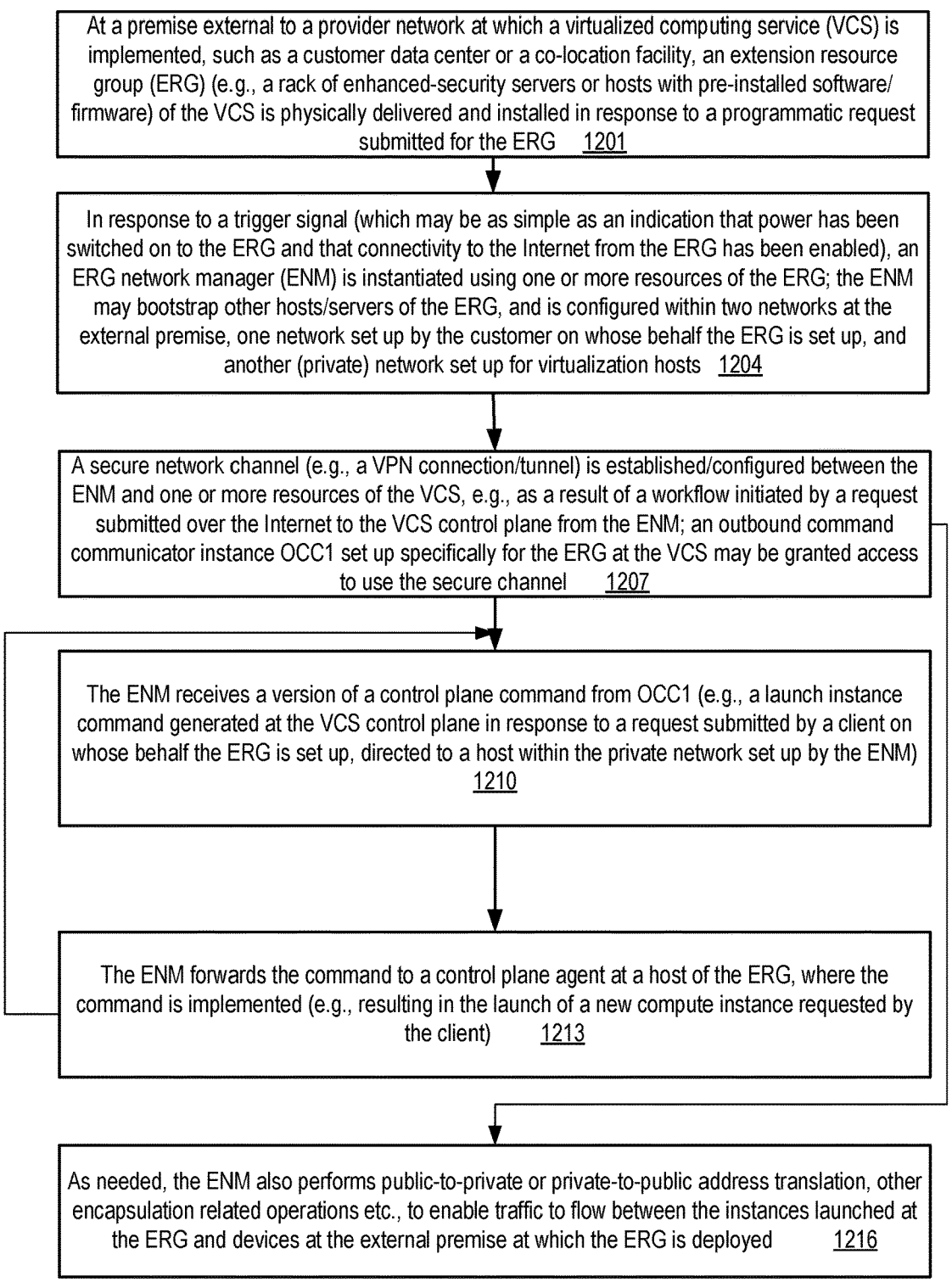
FIG. 12 is a flow diagram illustrating aspects of operations that may be performed at an extension resource group of a virtualized computing service, according to at least some embodiments.

FIG. 12 is a flow diagram illustrating aspects of operations that may be performed at an extension resource group of a virtualized computing service, according to at least some embodiments. As shown in element 1201, an extension resource group (ERG) (e.g., one or more racks or other containers of enhanced-security servers or hosts with pre-installed software/firmware) of a VCS of a provider network may be physically delivered and set up at a location in response to a programmatic request submitted for the ERG. The location at which the equipment is set up may comprise a premise external to the data centers of the provider network itself, such as a customer data center, a co-location facility, or a remote work location of an organization such as a telecommunications company or energy company in at least some embodiments.

In response to one or more trigger signals (which may be as simple as an indication that power has been switched on at one or more devices of the ERG and/or that connectivity to the Internet from the ERG has been enabled), at least a portion of an ERG network manager (ENM) may be instantiated or started using one or more resources of the ERG in some embodiments (element 1204). In one embodiment, at least a portion of the ENM's functionality may be implemented at a hardware card (e.g., a PCI card). The ENM may comprise one or more processes or threads of executions at one or more computing devices or hosts of the ERG in other embodiments. The ENM may bootstrap or otherwise initialize at least some of the other hosts/servers of the ERG in the depicted embodiment. In at least some embodiments, an ENM may perform one or more DHCP functions, e.g., including assigning addresses from a VCS control plane's host network address range to the hosts being bootstrapped. The ENM itself may be configured as a member of two networks in some embodiments—one network set up by a customer on whose behalf the ERG was delivered, and a second (private) network which includes the ERG hosts at which compute instances may be established.

A secure network channel (e.g., a VPN connection/tunnel and/or a connection using a dedicated physical link) may be established/configured between the ENM and one or more resources of the VCS in various embodiments (element 1207), e.g., as a result of a workflow initiated by a request submitted over the Internet to the VCS control plane from the ENM. An outbound command communicator instance OCC1 set up specifically for transmitting/forwarding administrative commands to the ERG from the VCS control plane may be granted access to use the secure channel in at least some embodiments. In at least one embodiment, as described earlier, OCC1 may comprise a virtual machine with multiple virtual network interfaces (VNIs) attached, including one VNI which is used only to receive commands from the VCS control plane, and another VNI which can be used to transmit (potentially modified versions of) the commands to the ERG via the secure channel.

After the secure channel is established, the VCS client on whose behalf the ERG was set up (and/or other users/groups to whom access to the ERG is granted) may begin transmitting programmatic requests (such as requests to launch compute instances at ERG virtualization hosts) in various embodiments. The ENM of the ERG may receive a version of a control plane command from OCC1 (e.g., a launch VM command generated at the VCS control plane in response to a request submitted by a client on whose behalf the ERG is set up) in the depicted embodiment (element 1210). A path similar to that shown in FIG. 5 may be used for the command in some embodiments, involving one or more message transformations, address translations or the like. In at least one embodiment, the network address at which the command is received by the ENM may be part of the customer-configured network mentioned above. The ENM may forward the command to a control plane agent at a host of the ERG, where the command may be implemented (e.g., resulting in the launch, at the host, of a new VM requested by the client, in the case where the command was generated in response to a client request to instantiate a VM) (element 1213). The host may be part of the private network set up at the ERG in various embodiments, and, within the second network, may be assigned a network address from the range that is used within the VCS control plane for other hosts. As and when additional commands generated at the VCS control plane are received, the ENM may forward them to the appropriate virtualization hosts, iterating operations corresponding to elements 1210 and 1213 in the depicted embodiment.

The ENM may perform several other kinds of functions in some embodiments, in addition to forwarding commands from the VCS control plane to ERG hosts. As needed, for example, the ENM may also perform public-to-private or private-to-public address translation, other encapsulation related operations etc., to enable traffic to flow between the compute instances launched at the ERG and devices at the external premise at which the ERG is deployed (element 1216).

It is noted that in various embodiments, some of the operations shown in FIG. 11 and/or FIG. 12 may be implemented in a different order than that shown in the figure, or may be performed in parallel rather than sequentially. Additionally, some of the operations shown in FIG. 11 and/or FIG. 12 may not be required in one or more implementations.

Use Cases

The techniques described above, of logically and securely extending the data plane of a network-accessible service of a provider network, such as a virtualized computing service, into premises outside the provider network, may be extremely useful in a variety of scenarios. Many organizations that utilize provider network resources (such as virtual machines of various capability levels) for features such as scalability, availability, reliability, security and affordability may wish to utilize similar resources at locations of their choice—e.g., within customer data centers, co-location facilities and/or temporary field work sites. In some cases such locations may be preferred because of access to large amounts of application data that may be stored at the locations; provider network clients may prefer to avoid the costs and/or delays associated with transferring such large volumes of data over the Internet to the provider network's own data centers, and may wish to ensure that the data does not leave the customers' own premises, if possible. Clients may sometimes need to use virtual machines, and/or services which use the virtual machines as building blocks, in remote locations (e.g., near oil rigs, cell phone towers, scientific data gathering sensor arrays and the like) with potentially unreliable or expensive connections to the Internet. Some organizations may, for example, have a large number of engineers/designers in an office or other physical location, and may need rendering or other compute intensive operations to be performed using virtual machines within very low-latency distances of the engineers/designers. The ability to support, using local equipment at any desired location with Internet connectivity, the same capabilities as those offered at provider network data centers may greatly expand the range of applications that can be run efficiently and securely by provider network clients.

Illustrative Computer System

Figure 13:
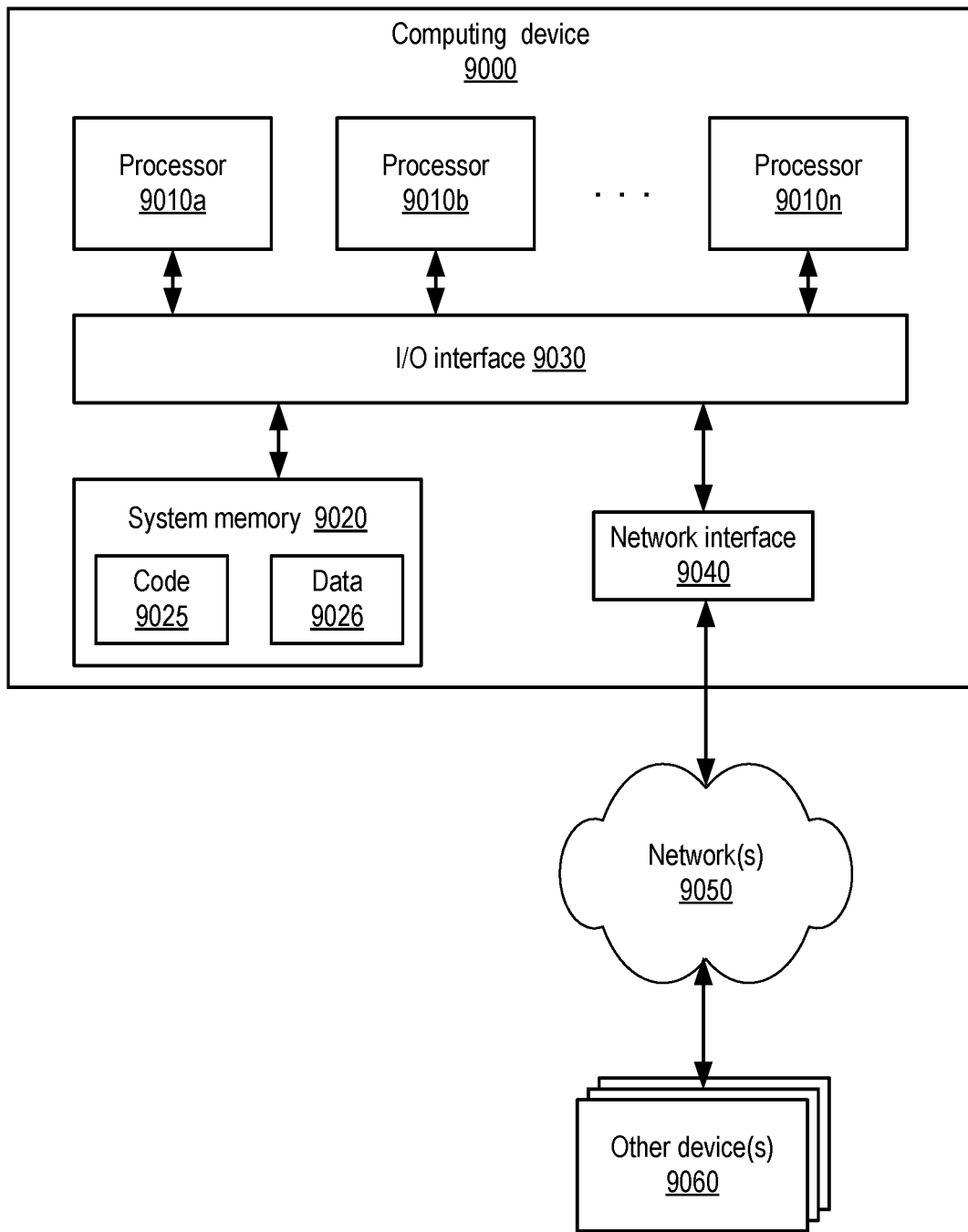
FIG. 13 is a block diagram illustrating an example computing device that may be used in at least some embodiments.

In at least some embodiments, a server that implements one or more of the control-plane and data-plane components that are used to support the types of service extension techniques described herein (e.g., the setting up and use of extension resource groups of virtualized computing services at selected locations outside a provider network's data centers) may include a general-purpose computer system that includes or is configured to access one or more computer-accessible media. FIG. 13 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 12, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 12. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 13 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   a first network manager; and
   one or more computing devices of an extension resource group of a virtualized computing service of a provider network, wherein the extension resource group includes at least a first virtualization host comprising a tamper-resistant storage device and a trusted platform module, wherein the first virtualization host is located at a first premise external to the provider network, wherein a first network configured at the first premise comprises a first range of network addresses, and wherein virtualization hosts of the virtualized computing service located at one or more data centers of the provider network are assigned respective network addresses from a second range of network addresses;
   wherein the first network manager includes instructions that upon execution on a processor cause the first network manager to:
      obtain, via a secure network channel, a message comprising a virtual machine launch command, transmitted from a first outbound command communicator associated with the extension resource group, wherein the virtual machine launch command is generated in response to a request submitted via a public application programming interface of the virtualized computing service, and wherein a destination address of the message, assigned to the first network manager, is within the first range of network addresses; and
      transmit the virtual machine launch command from the first network manager to a first virtualization host of the extension resource group, wherein processing of the virtual machine launch command at the first virtualization host results in an instantiation of a virtual machine at the first virtualization host, and wherein, within a private network established at the first extension resource group, the first virtualization host is assigned an address from the second range.

2. The system as recited in claim 1, wherein at least a portion of the first network manager is started in response to one or more of: (a) a power-on signal at a particular device of the extension resource group or (b) an indication that a particular device of the extension resource group has access to the Internet.

3. The system as recited in claim 1, wherein the first network manager includes further instructions that upon execution on the processor further cause the first network manager to:
perform a first set of one or more transformation operations on a first network packet generated at the virtual machine; and
transmit the transformed version of the first network packet to a first network endpoint, wherein the first network endpoint is (a) not part of the provider network and (b) not part of the extension resource group.

4. The system as recited in claim 1, wherein the first network manager includes further instructions that upon execution on the processor further cause the first network manager to:
initiate a bootstrap operation at the first virtualization host.

5. The system as recited in claim 1, wherein at least a portion of the first network manager is implemented at a peripheral card of the extension resource group.

6. A method, comprising:
obtaining, at a first network manager of an extension resource group of a virtualized computing service of a provider network, a message comprising a virtual machine launch command to launch a compute instance at a first host of the extension resource group, wherein the first host comprises a tamper-resistant storage device and a trusted platform module and is located at a first premise external to the provider network, wherein the message is obtained by the first network manager from a first outbound command communicator associated with the extension resource group at an address within a first address range of a first network configured at the first premise, wherein the virtual machine launch command is generated in response to a request submitted via a public application programming interface of the virtualized computing service; and
transmitting the virtual machine launch command from the first network manager to the first host to cause the first host to instantiate the compute instance, wherein, within a second network configured at the first premise, the first host is assigned an address within a second address range, wherein one or more addresses of the second address range are assigned to respective hosts within the provider network by a control plane of the provider network.

7. The method as recited in claim 6, further comprising:
verifying, using a security module of the first host, prior to instantiating the compute instance, that the first host meets an acceptance criterion.

8. The method as recited in claim 6, wherein the first host comprises a first storage device, the method further comprising:
storing an encrypted version of state information of the compute instance at a first storage device, wherein decryption of the encrypted version requires the first storage device to be physically attached to the first host.

9. The method as recited in claim 6, wherein the extension resource group comprises a compute instance image cache, wherein instantiating the compute instance comprises:
utilizing a particular compute instance image obtained from the cache.

10. The method as recited in claim 6, further comprising:
obtaining an indication of one or more entities authorized to request launches of compute instances within the extension resource group; and
verifying, prior to instantiating the compute instance, that the compute instance was requested by an entity of the one or more entities.

11. The method as recited in claim 6, wherein at least a portion of the first network manager is implemented at a card attached to a host of the extension resource group via a peripheral interface.

12. The method as recited in claim 6, wherein the first host is incorporated within a first rack of the extension resource group, and wherein at least a portion of the first network manager is implemented at one or more devices which are not incorporated within the first rack.

13. The method as recited in claim 6, further comprising:
instantiating, in response to one or more trigger signals, the first network manager; and
initiating, by the first network manager, configuration of a secure network channel for communicating with at least a portion of the provider network.

14. The method as recited in claim 13, wherein the one or more trigger signals include one or more of: (a) a power-on signal at a particular device of the extension resource group or (b) an indication that a particular device of the extension resource group has access to the Internet.

15. The method as recited in claim 6, further comprising:
initiating, by the first network manager, a bootstrap operation at the first host.

16. One or more non-transitory computer readable storage media storing program instructions executable on or across one or more processors cause the one or more processors to:
obtain, at a first network manager of an extension resource group of a virtualized computing service of a provider network, a message comprising a virtual machine launch command to launch a compute instance at a first host of the extension resource group, wherein the first host comprises a tamper-resistant storage device and a trusted platform module and is located at a first premise external to the provider network, wherein the message is obtained by the first network manager from a first outbound command communicator associated with the extension resource group at an address within a first address range of a first network configured at the first premise, wherein the virtual machine launch command is generated in response to a request submitted via a public application programming interface of the virtualized computing service; and
cause transmission of the virtual machine launch command from the first network manager to the first host to cause the first host to instantiate the compute instance, wherein, within a second network configured at the first premise, the first host is assigned an address within a second address range, wherein one or more addresses of the second address range are assigned to respective hosts within the provider network by a control plane of the provider network.

17. The one or more non-transitory computer readable storage media as recited in claim 16, wherein the program instructions are further executable to cause the one or more processors to:

verify, using the trusted platform module of the first host, prior to instantiating the compute instance, that the first host meets an acceptance criterion.

18. The one or more non-transitory computer readable storage media as recited in claim 16, wherein the program instructions are further executable to cause the one or more processors to:
   store an encrypted version of state information of the compute instance at the tamper-resistant storage device, wherein decryption of the encrypted version requires the tamper-resistant storage device to be physically attached to the first host.

19. The one or more non-transitory computer readable storage media as recited in claim 16, wherein the program instructions are further executable to cause the one or more processors to:
   obtain an indication of one or more entities authorized to request launches of compute instances within the extension resource group; and
   verifying, prior to instantiating the compute instance, that the compute instance was requested by an entity of the one or more entities.

20. The one or more non-transitory computer readable storage media as recited in claim 16, wherein the program instructions are further executable to cause the one or more processors to:
   initiate, by the first network manager, configuration of a secure network channel for communicating with at least a portion of the provider network.

* * * * *